United States Patent
Herre et al.

(10) Patent No.: US 8,627,780 B2
(45) Date of Patent: Jan. 14, 2014

(54) PAINTING DEVICE AND ASSOCIATED METHOD

(75) Inventors: Frank Herre, Oberriexingen (DE); Jürgen Haas, Knittlingen (DE); Thomas Hezel, Asperg (DE); Bernd Leiensetter, Ilsfeld (DE)

(73) Assignee: Durr Systems GmbH, Bietigheim-Bissingen (DE)

( * ) Notice: Subject to any disclaimer, the term of this patent is extended or adjusted under 35 U.S.C. 154(b) by 217 days.

(21) Appl. No.: 13/062,070

(22) PCT Filed: Aug. 19, 2009

(86) PCT No.: PCT/EP2009/006007
§ 371 (c)(1),
(2), (4) Date: Mar. 3, 2011

(87) PCT Pub. No.: WO2010/025827
PCT Pub. Date: Mar. 11, 2010

(65) Prior Publication Data
US 2011/0166708 A1    Jul. 7, 2011

(30) Foreign Application Priority Data
Sep. 3, 2008 (DE) .......................... 10 2008 045 553

(51) Int. Cl.
*B05B 3/00* (2006.01)
*B05C 11/00* (2006.01)
*B05B 1/28* (2006.01)

(52) U.S. Cl.
USPC ............ 118/323; 118/695; 118/698; 118/326

(58) Field of Classification Search
USPC ......... 118/323, 313–315, 324, 326, 309, 634, 118/DIG. 7, 695–698; 427/427.2, 427.3, 427/424; 454/50, 53; 901/43; 55/DIG. 46
See application file for complete search history.

(56) References Cited

U.S. PATENT DOCUMENTS

| | | | | |
|---|---|---|---|---|
| 4,630,567 A * | 12/1986 | Bambousek et al. | ......... | 118/323 |
| 5,014,644 A * | 5/1991 | Yamamoto et al. | ......... | 118/314 |
| 5,358,568 A | 10/1994 | Okano et al. | | |
| 5,427,619 A * | 6/1995 | Ehinger et al. | ................ | 118/323 |
| 6,776,843 B2 * | 8/2004 | Fouvet et al. | ................. | 118/323 |

(Continued)

FOREIGN PATENT DOCUMENTS

| | | |
|---|---|---|
| DE | 2915603 A1 | 10/1980 |
| DE | 9212718 U1 | 11/1992 |

(Continued)

OTHER PUBLICATIONS

International Search Report No. PCT/EP2009/006007, Dated Jan. 7, 2010.

*Primary Examiner* — Yewebdar Tadesse
(74) *Attorney, Agent, or Firm* — Bejin VanOphem & Bieneman PLC

(57) ABSTRACT

Exemplary painting devices for painting components, e.g., motor vehicle bodies or parts thereof, and associated exemplary methods are disclosed. An exemplary painting device may include a multi-axis painting robot positioning an atomizer, a robot controller for controlling the painting robot, and a controls enclosure comprising the robot controller. An exemplary controls enclosure may be a load-bearing column that mechanically supports the painting robot.

21 Claims, 21 Drawing Sheets

(56) References Cited

U.S. PATENT DOCUMENTS

| | | | |
|---|---|---|---|
| 7,429,298 B2* | 9/2008 | Krogedal et al. | 118/323 |
| 2003/0226940 A1* | 12/2003 | Karlinger | 248/79 |
| 2004/0144306 A1* | 7/2004 | Milojevic et al. | 118/315 |
| 2005/0166413 A1* | 8/2005 | Crampton | 33/503 |
| 2006/0081175 A1* | 4/2006 | Nagase | 118/220 |
| 2006/0207500 A1* | 9/2006 | Herre | 118/323 |
| 2006/0272311 A1* | 12/2006 | Melcher | 59/78.1 |
| 2006/0292308 A1 | 12/2006 | Clifford et al. | |
| 2009/0017212 A1* | 1/2009 | Clifford | 427/294 |
| 2010/0269750 A1* | 10/2010 | Vandepitte | 118/314 |

FOREIGN PATENT DOCUMENTS

| | | |
|---|---|---|
| DE | 69102353 T2 | 10/1994 |
| DE | 4430234 A1 | 3/1995 |
| DE | 10103067 A1 | 7/2002 |
| DE | 69629246 T2 | 4/2004 |
| DE | 102004033640 A1 | 5/2005 |
| DE | 102004056493 A1 | 1/2006 |
| DE | 102004040162 A1 | 3/2006 |
| DE | 102006032804 A1 | 1/2008 |
| DE | 102006058350 A1 | 6/2008 |
| EP | 0349177 A2 | 1/1990 |
| FR | 2710858 A1 * | 4/1995 |
| FR | 2777483 A1 | 10/1999 |
| FR | 2804349 A1 | 8/2001 |
| WO | WO-9952645 A1 | 10/1999 |

* cited by examiner

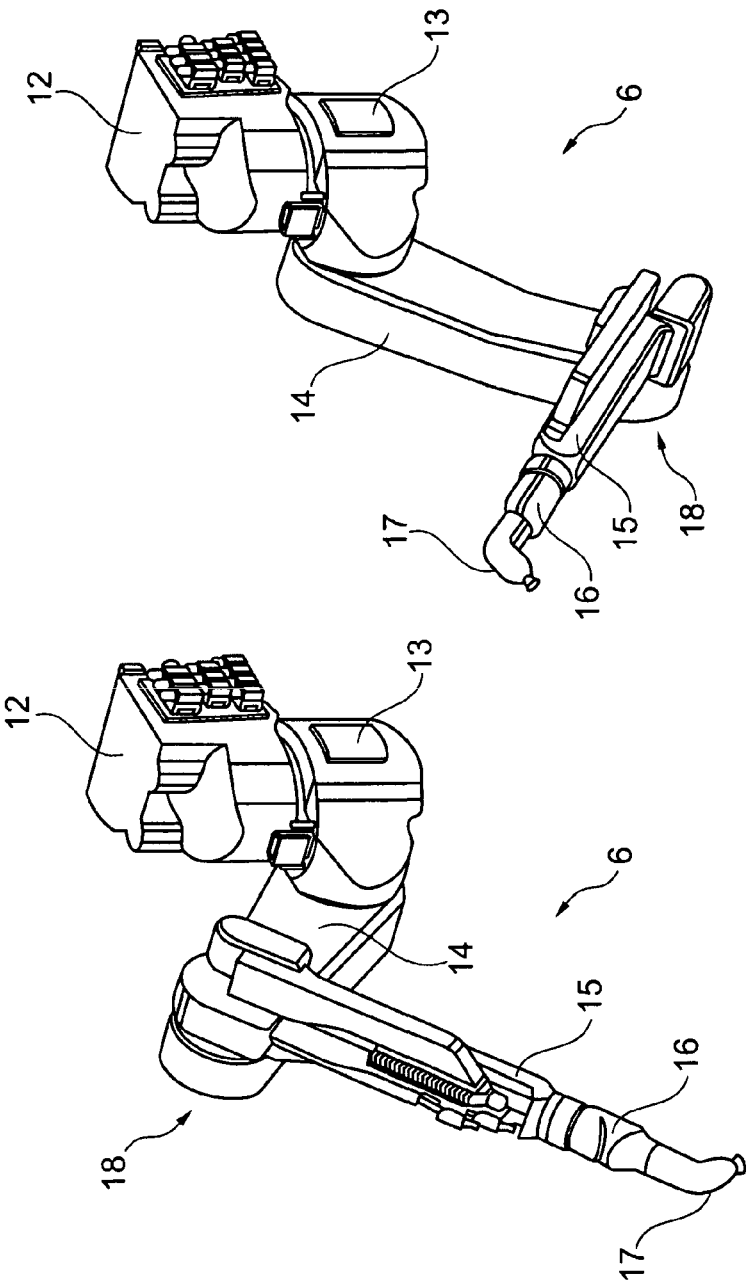

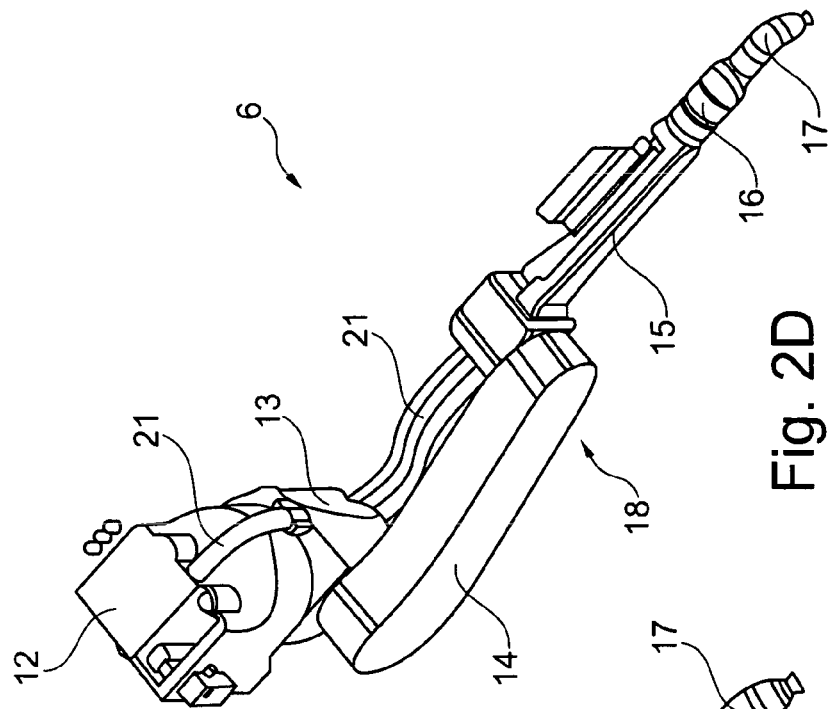
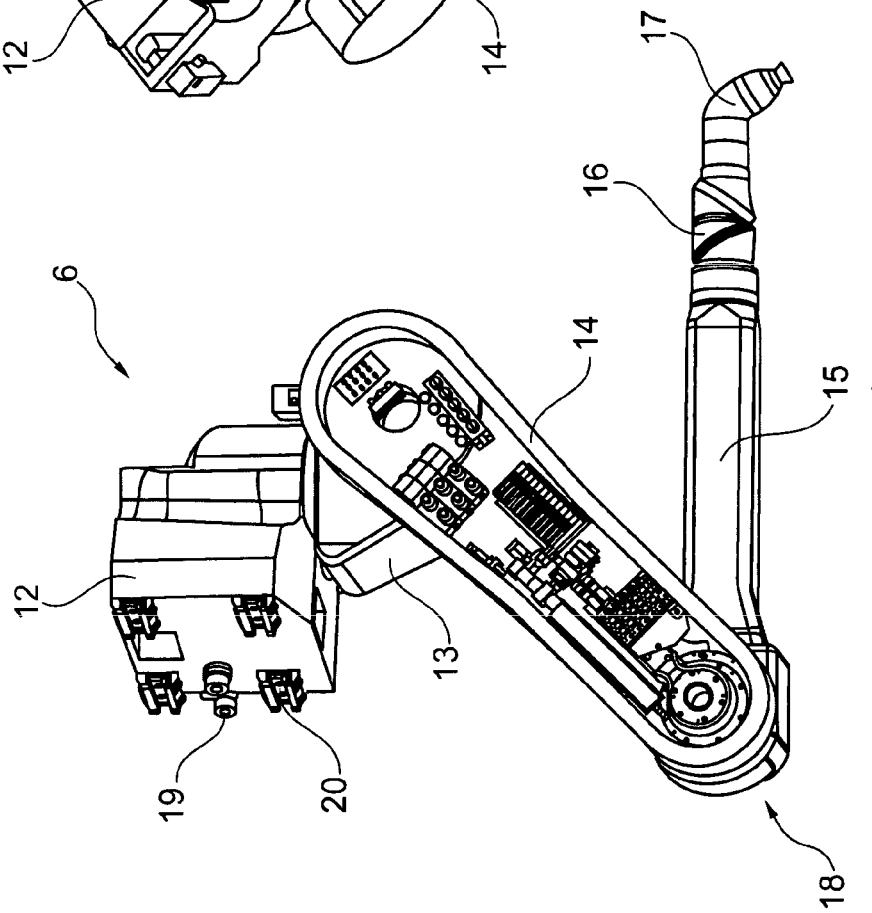
Fig. 2D
Fig. 2C

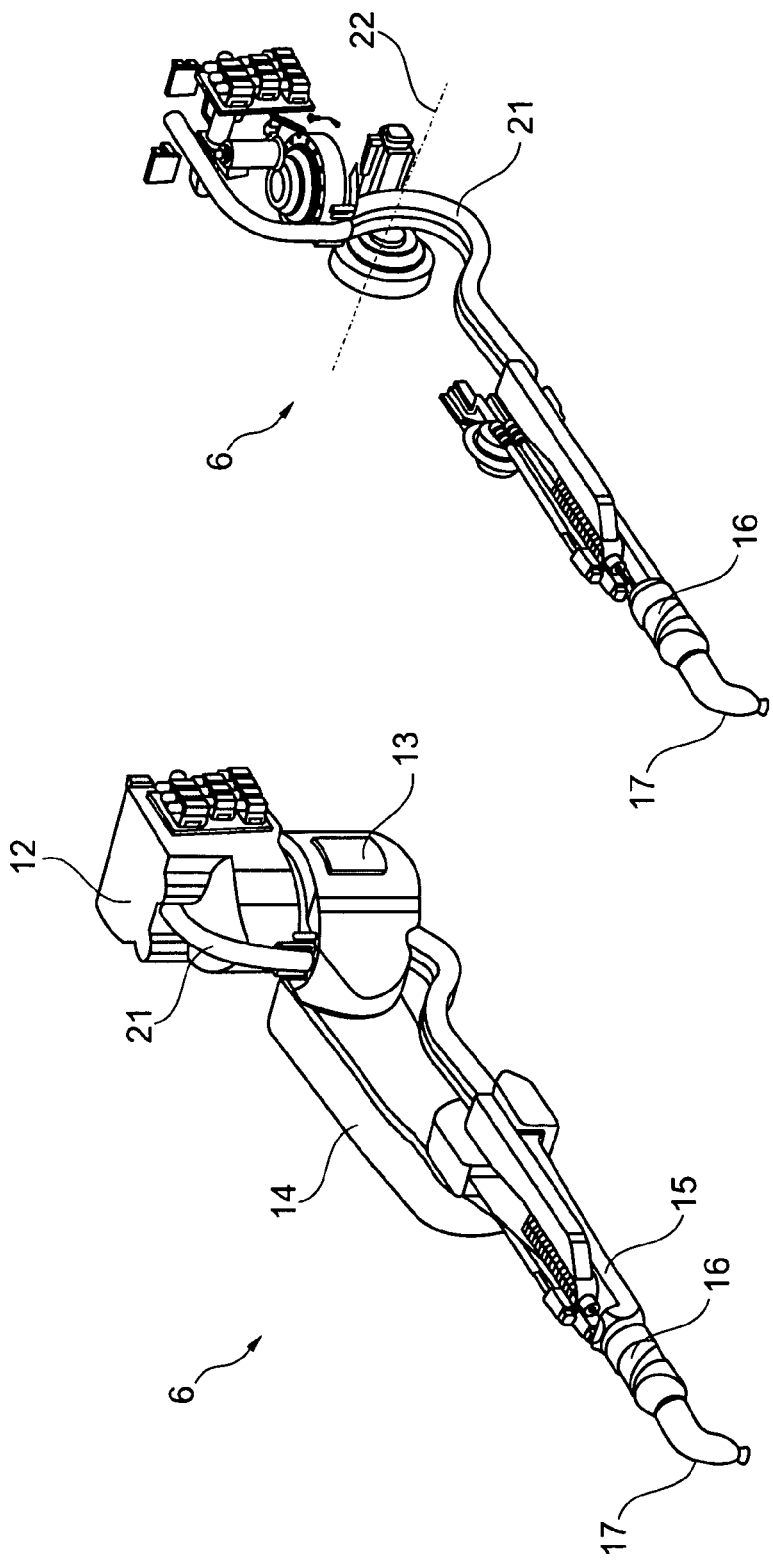

PAINTING DEVICE AND ASSOCIATED METHOD

CROSS-REFERENCES TO RELATED APPLICATIONS

This application is a National Stage application which claims the benefit of International Application No. PCT/EP2009/006007 filed Aug. 19, 2009, which claims priority based on German Application No. 10 2008 045 553.9, filed Sep. 3, 2008, both of which are hereby incorporated by reference in their entirety.

BACKGROUND

The present disclosure relates to a painting device for painting components, e.g., for painting motor vehicle bodies or parts thereof. Furthermore, the present disclosure relates to an associated method for manufacturing, testing and/or installing a painting device.

In modern painting facilities for painting motor vehicle bodies, use is made of multi-axis painting robots which have as the application device for example a rotary atomizer. In this case, the painting robot is actuated by a robot controller which is usually arranged outside the painting booth in a control cabinet and is connected to the painting robot during installation of the painting facility. Furthermore, the various supply lines for the media necessary for operation of the painting robot (e.g. compressed air, paints, flushing agents) must also be connected during installation of the painting robot. These conventional painting facilities have various disadvantages, as will be discussed below.

On the one hand, the connection of the painting robot during the final installation requires a considerable outlay on staff, which increases the installation costs. Furthermore, a certain installation time is also required, which in the event of retrofitting an existing painting facility gives rise to a corresponding retrofitting time and downtime of the painting facility, which may lead to production losses.

On the other hand, mistakes in the connection to the robot controller or in the connection of the supply lines may occur during the final installation of the painting robot, so that the painting robot must undergo a complicated functional test after the final installation, the retrofitting time and the corresponding downtime of the painting facility being extended by the time required for testing.

Furthermore, with regard to the prior art, reference may be made to DE 92 12 718 U1, DE 29 15 603 C2, DE 691 02 353 T2, DE 44 30 234 A1 and DE 696 29 246 T2.

Accordingly, there is a need for a suitably improved painting device and an associated method.

On the one hand, it is desirable to reduce the installation time necessary for the final installation of the painting robot at the customer's premises, which leads to a correspondingly shortened downtime of the painting facility.

On the other hand, the exemplary illustrations below aim where possible to avoid installation errors during the final installation of the painting robot in the painting facility.

This object is achieved by a painting device according to the exemplary illustrations below and by a corresponding method.

BRIEF DESCRIPTION OF THE FIGURES

While the claims are not limited to the specific illustrations described herein, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an illustration. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

FIGS. 2A-2F show different perspective views of the painting robots of FIG. 1.

DETAILED DESCRIPTION

Figure 1:
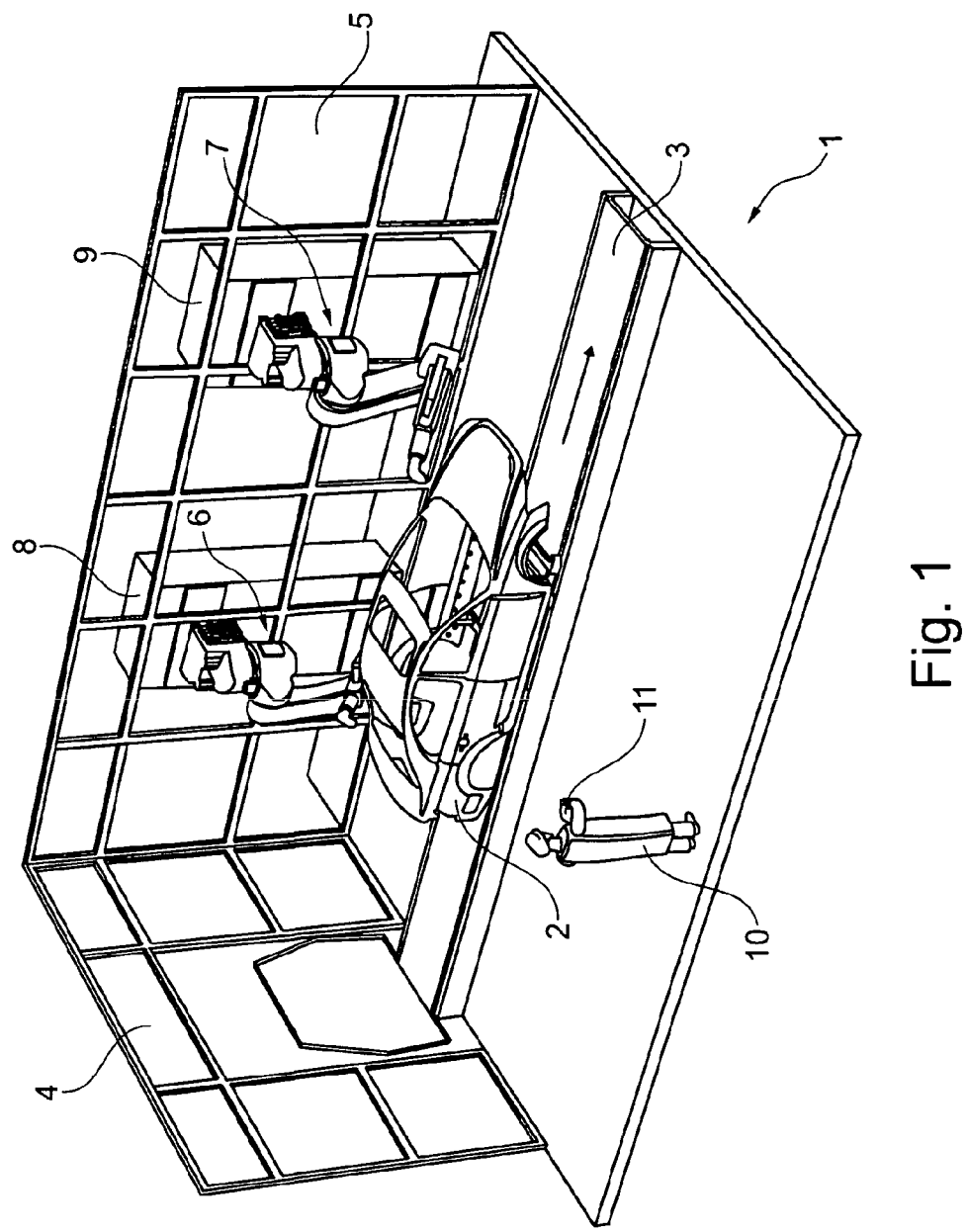
FIG. 1 shows a perspective view of a painting booth with two painting robots mounted in a stationary manner.

The exemplary illustrations comprise the general technical teaching of delivering the painting robot in a preassembled form as a finished module including the robot controller and a mechanical support, so that the preassembled module can then be easily installed in the painting facility at the customer's premises without requiring a long installation time.

An exemplary painting device may comprise a multi-axis painting robot. It must therefore be mentioned only briefly that an exemplary painting robot, including a multi-axis robot hand axle, may have 5, 6, 7 or 8 movable axles. In one example, therefore, the term "painting robot" used in the context of the exemplary illustrations must be distinguished from conventional ceiling-mounted machines or side-mounted machines which are likewise used for painting motor vehicle bodies.

The painting robot may guide a rotary atomizer as the application device, but other types of atomizer are also possible in the context of the exemplary illustrations, such as for example airmix devices, airless devices, air atomizers or ultrasonic atomizers.

The exemplary illustrations may allow for applying paints, such as for example liquid coatings or powder coatings. Various types of paint can be applied, such as for example primer, basecoat or clearcoat. However, the exemplary illustrations are not limited to the types of coating agent mentioned above by way of example, but rather can in principle be carried out also with other types of coating agents.

Furthermore, exemplary painting devices may comprise in a conventional manner a robot controller which is connected to the painting robot and controls the latter according to a predefined program.

The robot controller may be accommodated in a control cabinet.

The exemplary illustrations may also provide that the control cabinet forms a support column for the painting robot, or that the support column for the painting robot forms the control cabinet and accommodates the robot controller. Accordingly, the control cabinet may have a dual function since the control cabinet on the one hand contains the robot controller and on the other hand serves as a mechanical support element for the painting robot. This dual function of the control cabinet advantageously allows a preassembly of the painting robot with the robot controller and the control cabinet, so that the preassembled module can then be easily and quickly installed in the painting facility at the customer's premises. In the context of the exemplary illustrations, therefore, the control cabinet is modified in comparison to the conventional control cabinets so as to be able to perform the mechanical support function for the painting robot.

In one example, the painting robot is mechanically borne exclusively by one or more control cabinets, each configured as a support column. However, it is also possible as an alternative that the control cabinet configured as a support column is merely one element providing mechanical support alongside other support elements, so that the control cabinet merely helps to mechanically support the painting robot.

It should also be mentioned that, with regard to the shape of the control cabinet, the exemplary illustrations are not limited to a specific shape such as that of a conventional cabinet. Instead, the control cabinet may also have other shapes, such as for example the shape of a bracket or a box.

It has already been mentioned above that the exemplary illustrations allow a preassembly of the painting robot with the robot controller and the control cabinet configured as a support column. In the case of such a modular preassembly, the control cabinet may advantageously have an interface via which all the fluid and electrical supply lines necessary for operation of the painting robot can be connected. This is advantageous since then only a single interface has to be connected in order to allow operation of the painting robot, as a result of which the final installation time is reduced. The supply lines necessary for operation of the painting robot are in this case may be guided in the preassembled module from the interface of the control cabinet to the painting robot, so that no further installation work is required within the preassembled module during final installation.

However, the exemplary illustrations are not limited to the variant described above in which the painting robot together with the robot controller and the control cabinet configured as a support column is delivered as a preassembled module. Instead, it is also possible in the context of the exemplary illustrations that the painting robot is delivered separately from the robot controller and the control cabinet and then is installed and connected to the robot controller at the customer's premises. In this variant, the painting robot may have an interface via which the painting robot is detachably connected to the control cabinet configured as a support column. This interface between the painting robot and the control cabinet may serve also for the mechanical connection between the painting robot and the control cabinet configured as a support column. The interface between the painting robot and the control cabinet configured as a support column therefore may contain all the fluid supply lines (e.g. lines for paint, flushing agent and compressed air) and electrical supply lines (e.g. control lines and sensor lines) between the control cabinet and the painting robot that are necessary for operation of the painting robot.

In the two variants mentioned above (preassembled module and non-preassembled module), the respective interface may comprise the pneumatic line which is necessary for supplying compressed air to the painting robot, for example in order to drive a compressed air turbine of a rotary atomizer. Furthermore, the interface may comprise at least one paint line for supplying the paint to be applied. The exemplary illustrations may also comprise a flushing agent line, via which a flushing agent can be supplied in order to flush the painting robot and in particular the rotary atomizer in the event of a color change. For the same reason, the interface may also comprise a return line for the return of flushing agent and/or paint from the painting robot. Furthermore, the interface may also contain electrical control lines for actuation of the robot by the robot controller and/or at least one sensor line for the reporting of sensor variables from the painting robot to the robot controller.

It has already been mentioned above that the painting robot may be a multi-axis painting robot which has for example, including a multi-axis robot hand axle, 5, 6, 7 or 8 movable axles. The painting robot may comprise a robot base which is either displaceable or mounted in a stationary manner, a rotatable robot part, a pivotable proximal robot arm ("arm 1") and a pivotable distal robot arm ("arm 2").

In one example, the rotatable robot part is rotatable relative to the robot base about a substantially vertical axis of rotation, and the rotatable robot part may be arranged below the robot base. With regard to the axis of rotation of the rotatable robot part, the exemplary illustrations are not limited to a precisely vertical axis of rotation. Instead, the axis of rotation may also be angled slightly. The only important thing in this example of embodiment is that the axis of rotation of the rotatable robot part runs substantially vertically. In this example, the proximal robot arm may be pivotable about a pivot axis which runs substantially horizontally, this also applying to the distal robot arm which may likewise be pivotable about a horizontal pivot axis relative to the proximal robot arm.

In another example, the rotatable robot part is by contrast rotatable relative to the robot base about a substantially horizontal axis of rotation. In this example, the pivot axes of the proximal robot arm and of the distal robot arm may, by contrast, run at right angles to the axis of rotation of the rotatable robot part, in particular at right angles to the conveying direction of the components in the painting facility. This example is suitable for example for painting bumpers.

In both the abovementioned with different axes of rotation of the rotatable robot part, the rotatable robot part may optionally be arranged below the robot base, above the robot base or to the side of the robot base. However, it may be particularly advantageous if the rotatable robot part is arranged below the robot base since the painting robot is then particularly suitable for painting the interior of motor vehicle bodies.

Furthermore, the exemplary illustrations comprise a particular guidance of the supply hoses within the painting robot, said supply hoses being necessary for operation of the painting robot. For instance, the media (e.g. compressed air, paint and flushing agent) necessary for operation of the painting robot must be transported in the painting robot from the robot base to the distal robot arm and then through the robot hand axle to the atomizer, for which purposes usually flexible supply hoses are provided which deform in accordance with the robot movement. These supply hoses may in each case be guided through the so-called neutral fiber in the individual joints between the adjoining robot members. The neutral fiber is an imaginary line through the joint, which is not subjected to tensile or compressive stress in the longitudinal direction during a rotation of the joint but rather is subjected only to a bending load. The siting of the supply hoses in the neutral fiber of the joints offers the advantage that the supply hoses are not exposed to mechanical stress in the axial direction.

Furthermore, the supply hoses may in each case run through the axis of rotation of the joints, which likewise reduces the mechanical stress on the supply hoses.

Moreover, the individual supply hoses in the painting robot may in each case run in a hose plane from the rotatable robot part to the distal robot arm so that the supply hoses are bent only in the hose plane during a pivoting of the robot arms. The hose plane may thus be at right angles to the axis of rotation of the robot arms. This technical measure, too, reduces the mechanical stress on the supply hoses during a change in position of the robot and thus extends the life span of the supply hoses.

Furthermore, the painting robot according to the exemplary illustrations may comprise application technology, such as for example a color changer for selecting a desired color, wherein the color changer is connected on the input side to a plurality of color feed lines and on the output side to an atomizer. The application technology mounted in or on the painting robot may also comprise a metering pump or other metering systems, such as for example a metering cylinder, a plunger pump, radial screws. The application technology mounted in or on the painting robot may also comprise a motor for driving the metering pump or the other application technology. The application technology mounted on or in the painting robot may also comprise a paint pressure regulator for regulating the application pressure, and/or a high voltage generator for generating the high voltage required for electrostatic painting.

The aforementioned application technology may be arranged in or on the proximal robot arm. Alternatively, it is possible in the context of the exemplary illustrations that the application technology is arranged in or on the distal robot arm. It is also possible in the context of the exemplary illustrations that the application technology is arranged in a manner distributed over the different robot arms. In one exemplary illustration, the application technology for the rarely used paints ("low runners") is located on or in the proximal robot arm ("arm 1") while the application technology for the frequently used paints is located on or in the distal robot arm ("arm 2"), so that the lowest possible color change losses occur for the frequently used paints ("high runners").

In one example, the distal robot arm is pivotably connected to the proximal robot arm via a so-called elbow joint, wherein the elbow joint is directed downward ("elbow down") in at least one robot position.

In this case, the robot base may be arranged above the motor vehicle bodies to be painted, so that the atomizer is located below the robot base. This elevated arrangement of the painting robot is advantageous inter alia because excess coating agent residues ("overspray") are pushed downward by the downwardly directed airflow in the painting booth and therefore accumulate to a lesser extent on the elevated painting robot. The elevated arrangement of the painting robot thus advantageously reduces the tendency for soiling of the painting robot.

This robot position ("elbow down") facilitates the painting of the interior of motor vehicle bodies when the distal robot arm in one robot position runs substantially horizontally and can be introduced in the horizontal direction into the interior of a motor vehicle body in order to paint the interior.

In the "elbow down" robot position, the set-up on the distal robot arm ("arm 2") can be greater than in the "elbow up" robot position. This means that more application technology can be installed in the distal robot arm, as a result of which the consumption of paint and solvent is reduced.

Furthermore, the exemplary painting robot may also allow a robot position in which the elbow joint between the proximal robot arm and the distal robot arm is directed upward ("elbow up").

The exemplary painting device may also comprise a conveyor which conveys the components to be painted through the painting device. The robot base is in this case may be offset in the upward direction relative to the conveyor, in particular at a height above the upper side of the components to be painted. This elevated arrangement of the painting robot—as already mentioned above—reduces the susceptibility of the painting robot to soiling since the linear flow through the painting booth from top to bottom pushes downward the paint particles ("overspray") not adhering to the components.

In another example, the robot base is mounted in a stationary manner so that the robot base is not movable. To this end, the robot base may be attached directly to the control cabinet forming the support column.

However, it is also possible as an alternative that the robot base together with the painting robot can be displaced on a displacement rail. In the case of the above-described preassembly of a module comprising the painting robot, the robot controller and the control cabinet configured as the support column, the preassembled module may also comprise the displacement rail.

In one example, the painting device additionally has a handling robot which can open and close doors or hoods of the motor vehicle bodies to be painted, so that the actual painting robot can carry out a painting of the interior of the motor vehicle bodies. The handling robot may in this case be mounted on a displacement rail, wherein the displacement rail is likewise mounted on the control cabinet configured as the support column. In the case of the aforementioned preassembled modular construction, the preassembled module may thus also comprise the displacement rail for the handling robot and/or the handling robot.

An exemplary displacement rail for the handling robot may be mechanically borne by the control cabinet configured as the support column. However, it is also possible that the displacement rail for the handling robot is additionally borne by further mechanical support structures.

Moreover, the displacement rail for the handling robot may be mounted on the same support column as that on which the painting robot is also mounted in a stationary manner.

It should also be mentioned that the painting robot may be mounted above the handling robot on the support column, which facilitates operation.

It should also be mentioned that the displacement rail for the handling robot may be configured as a so-called stub rail. This means that the displacement rail for the handling robot is shorter than the painting booth.

Furthermore, it may be advantageous if the displacement rail for the handling robot is arranged offset relative to the painting robot in the conveying direction of the components. This is particularly advantageous when the components to be painted are transported through the painting booth at a high conveying speed, since the offset of the handling rail for the handling robot in the conveying direction then allows more time for the handling robot.

It has already been mentioned above that the painting robot may be arranged in a painting booth, wherein the painting booth may have smooth booth walls ("clean wall").

Furthermore, the booth walls of the painting booth may be at least partially transparent or have at least one viewing window so as to allow visual monitoring of the painting operation from outside.

It should also be mentioned in this connection that the control cabinet configured as the support column may be arranged outside the painting booth. This offers the advantage that the painting booth need not be entered in order to carry out maintenance work on the robot controller accommodated in the control cabinet.

In another examples, the painting robot has, in addition to an atomizer, a handling grip for opening doors or hoods of the motor vehicle bodies to be painted. The painting robot is therefore bifunctional in this example of embodiment, since the painting robot can optionally apply paint or serve as a handling robot.

In a further example, the support column forming the control cabinet is not arranged in a stationary manner but rather is displaceable. By way of example, the support column may be displaceable on one or more displacement rails, wherein the displacement rail for the support column may be oriented parallel to the conveying direction of the motor vehicle bodies to be painted. The support column may be oriented vertically, wherein the painting robot is displaceable along the support column in the vertical direction.

In another exemplary illustration, the painting robot is displaceable along a displacement rail, wherein the displacement rail is oriented in the conveying direction of the components to be painted, so that the displacement rail runs along the painting line. The painting robot is in this case connected to the displacement rail by a substantially vertically oriented carrier, wherein the carrier is guided on its upper side by the displacement rail and can be displaced along the displacement rail, while the carrier carries on its underside the robot base of the painting robot. In this case, therefore, the carrier ensures that the robot base of the painting robot is located in the lower region of the painting booth, even though the painting robot is displaceable along the elevated displacement rail. The carrier between the displacement rail and the painting robot thus allows a lowering of the painting robot relative to the displacement rail.

Furthermore, the exemplary illustrations also encompass a variant in which there is arranged in the painting booth a conveyor which conveys the components to be painted in a predefined conveying direction through the painting device. The painting robot is in this case likewise may be mounted in a displaceable manner on a displacement rail, one particular feature being that the displacement rail is oriented transversely to the conveying direction of the components to be painted. In this variant, therefore, the displacement rail for the painting robot may run at right angles to the conveying direction of the components to be painted, as a result of which it is possible to establish a painting booth with a very short booth length.

In the variant with a transverse displacement rail for the painting robot, the movement clearance for the painting robot on the displacement rail is usually limited by the lateral booth wall of the painting booth. In order to extend the movement clearance of the painting robot on the transversely running displacement rail, therefore, it is provided in one exemplary illustration that the booth wall has lateral indentations in the extension of the transversely running displacement rail, so that the painting robot on the displacement rail can be moved into the indentation of the painting booth. In this example, the booth width of the painting booth is therefore not constant but rather varies over the length of the booth, the booth width to the side of the displacement rail for the painting robot being greater than in the conveying direction in front of and behind the displacement rail for the painting robot.

The exemplary illustrations also encompasses a novel painting robot comprising a robot base on which at least two robot arms or other such robot members are movably articulated. In one exemplary, the two robot arms each guide an atomizer. By contrast, it is provided in another example that one robot arm guides an atomizer while the other robot arm guides a handling tool, in particular a gripper for opening or closing a hood or a door of a motor vehicle body.

Furthermore, the exemplary illustrations also encompass a method for manufacturing, testing and/or installing an exemplary painting device, exemplary methods being characterized in that the control cabinet is mechanically reinforced during manufacture so that it can mechanically support the painting robot.

Exemplary manufacturing methods may also be characterized in that the painting robot is attached directly or by means of a displacement rail or an attachment adapter to the control cabinet configured as the support column.

In an exemplary method, there may firstly take place a preassembly of a module which comprises the painting robot, the control cabinet, the robot controller and/or the displacement rail, the preassembly being carried out at the manufacturer's premises and not at the customer's premises.

This preassembly of the module may advantageously allow testing of the preassembled module, the testing likewise taking place at the manufacturer's premises. During this test, firstly the fluidic functioning of the atomizer can be tested. It is therefore possible to test whether the atomizer is operating correctly. Furthermore, the tests on the preassembled module may also include testing the correct movement capability of the painting robot. During the testing on the preassembled module, it is also possible to check whether the electrostatic charging of the coating agent is functioning correctly. Finally, it is also possible during the testing on the preassembled module to test whether the painting robot can be correctly moved on its displacement rail.

The exemplary method then may also comprise transporting the preassembled module to a site of installation at the customer's premises.

Furthermore, the exemplary method may also comprise the final installation of the preassembled and/or tested module at the site of installation, the module then being mechanically anchored and connected to all the lines necessary for operation of the painting robot and of the associated atomizer. Further testing is then however generally not necessary, as a result of which the final installation time is considerably reduced.

It has already been mentioned above that the exemplary painting robot is highly suitable for painting the interior of motor vehicle bodies due to its design ("elbow down"). The exemplary methods therefore also comprise painting the interior of motor vehicle bodies, wherein the painting robot is positioned in such a way that the elbow joint between the proximal robot arm and the distal robot arm is directed downward. The distal robot arm comprising the atomizer is then positioned in such a way that the distal robot arm is located to the side of the motor vehicle body to be painted, substantially at right angles to the conveying direction of the components to be painted. The distal robot arm comprising the atomizer is then oriented substantially horizontally and is introduced in the horizontal direction into the interior of the motor vehicle body to be painted, in order to paint the interior therein.

The perspective view in FIG. 1 shows an exemplary painting booth 1 which is arranged in a painting facility for painting motor vehicle bodies 2, wherein the motor vehicle bodies 2 are transported through the painting booth 1 by a conveying device 3 in the direction shown by the arrow.

Further painting booths for applying other coating agents to the motor vehicle bodies 2 may be arranged in the conveying direction in front of and behind the painting booth 1. By way of example, a basecoat layer may be applied to the motor vehicle bodies 2 in the painting booth 1. A primer will then be applied beforehand to the motor vehicle bodies 2 in the preceding painting booth (not shown). A clearcoat layer will then be applied to the motor vehicle bodies 2 in a painting booth (not shown) arranged downstream in the conveying direction.

The painting booth 1 has smooth booth walls 4, 5 running around the entire circumference, the booth walls not being shown in part so as to allow a view into the interior of the painting booth 1. The smooth booth walls 4, 5 have the advantage of a low susceptibility to soiling and the ability to be easily cleaned.

It should also be mentioned that the booth walls 4, 5 are largely transparent, which allows a person located outside the painting booth 1 to visually monitor the painting operation taking place in the interior of the painting booth 1.

In the painting booth, two multi-axis painting robots 6, 7 are each mounted in a stationary manner on a control cabinet 8, 9 configured as a support column.

Here, the two control cabinets 8, 9 are located outside the painting booth 1 and contain a robot controller for actuating the painting robots 6, 7. Maintenance can therefore be carried out on the robot controller in the control cabinets 8, 9 without the maintenance staff having to enter the painting booth 1.

The control cabinets 8, 9 are mechanically reinforced in comparison to conventional control cabinets so as to be able to perform a mechanical support function for the painting robots 6, 7 in addition to accommodating the robot controller.

Here, the two painting robots 6, 7 together with the associated control cabinets 8, 9 and the robot controller located therein form a preassembled module which is supplied in a preassembled and tested form by the manufacturer of the painting robots so that these modules can simply be positioned in the customer's premises during final installation. During the final installation, therefore, all that is required is a mechanical fixing of the control cabinets 8, 9 and a connection of the control cabinets 8, 9 to the lines necessary for operation (e.g. for compressed air, paint, flushing agent, power, etc.).

The robot controllers located in the control cabinets 8, 9 can be programmed by an operator 10 located outside the painting booth 1 by means of a portable programming device 11, wherein the programming device 11 allows a wireless transmission of data from and to the robot controllers.

FIGS. 2A to 2F show the structure of the painting robots 6, 7.

The painting robots 6, 7 substantially consist of a robot base 12, a rotatable robot part 13, a proximal robot arm 14, a distal robot arm 15, a robot hand axle 16 and a rotary atomizer 17.

The rotatable robot part 13 is in this case arranged below the robot base 12 and is rotatable relative to the robot base 12 about a vertical axis of rotation.

By contrast, the proximal robot arm 14 is pivotable relative to the rotatable robot part 13 about a horizontal pivot axis.

The same applies to the distal robot arm 15, which is pivotable relative to the proximal robot arm 14 about a horizontally running pivot axis.

It should also be mentioned that the proximal robot arm 14 is connected to the distal robot arm 15 by an elbow joint 18. In the robot position shown in FIG. 2A, the elbow joint 18 is directed upward ("elbow up"). In the robot position shown in FIG. 2B, the elbow joint 18 is by contrast directed downward ("elbow down"). The robot position shown in FIG. 2B with the downwardly directed elbow joint 18 is particularly suitable for painting the interior of the motor vehicle bodies 2 since the distal robot arm 15 can then easily be introduced laterally into the motor vehicle body 2 to be painted.

From FIG. 2C, it can also be seen that the robot base 12 has an interface 19 for connecting the supply lines necessary for operation of the painting robot 6. Furthermore, the robot base 12 also comprises a mechanical interface 20 for attaching the painting robot 6 to the control cabinet 8.

It can also be seen from FIG. 2C that application technology is mounted in the proximal robot arm 14, such as for example a metering means, a color changer or a high voltage cascade.

From the perspective view in FIG. 2D, it can moreover be seen that application technology is also installed on the distal robot arm 15, so that the application technology required for operation of the painting robot 6 is distributed over the two robot arms 14 and 15.

FIGS. 2D to 2F also show that flexible supply hoses run between the robot base 12 and the rotary atomizer 17 and supply for example the paint to be applied.

On the one hand it should be mentioned here that the supply hoses 21 between the rotatable robot part and the distal robot arm 15 in each case run in a hose plane which is oriented at right angles to the pivot axis of the robot arms 14, 15. This means that the supply hoses 21 are subjected only to a bending load in the hose plane, i.e. only in one direction, during a pivoting of the robot arms 14, 15.

On the other hand it should be mentioned that the proximal robot arm 14 is pivotable about a pivot axis 22 relative to the rotatable robot part 13, wherein the supply hoses 21 are guided through the pivot axis 22 in the joint between the proximal robot arm 14 and the rotatable robot part 13. This offers the advantage that the supply hoses 21 are subjected only to relatively minor mechanical stresses during a pivoting movement of the proximal robot arm 14.

For the same reason, the supply hoses 21 in the joints are in each case guided in the so-called neutral fiber in which only bending loads occur on the supply hoses 21, but no axial tensile or compressive forces.

Figure 3:
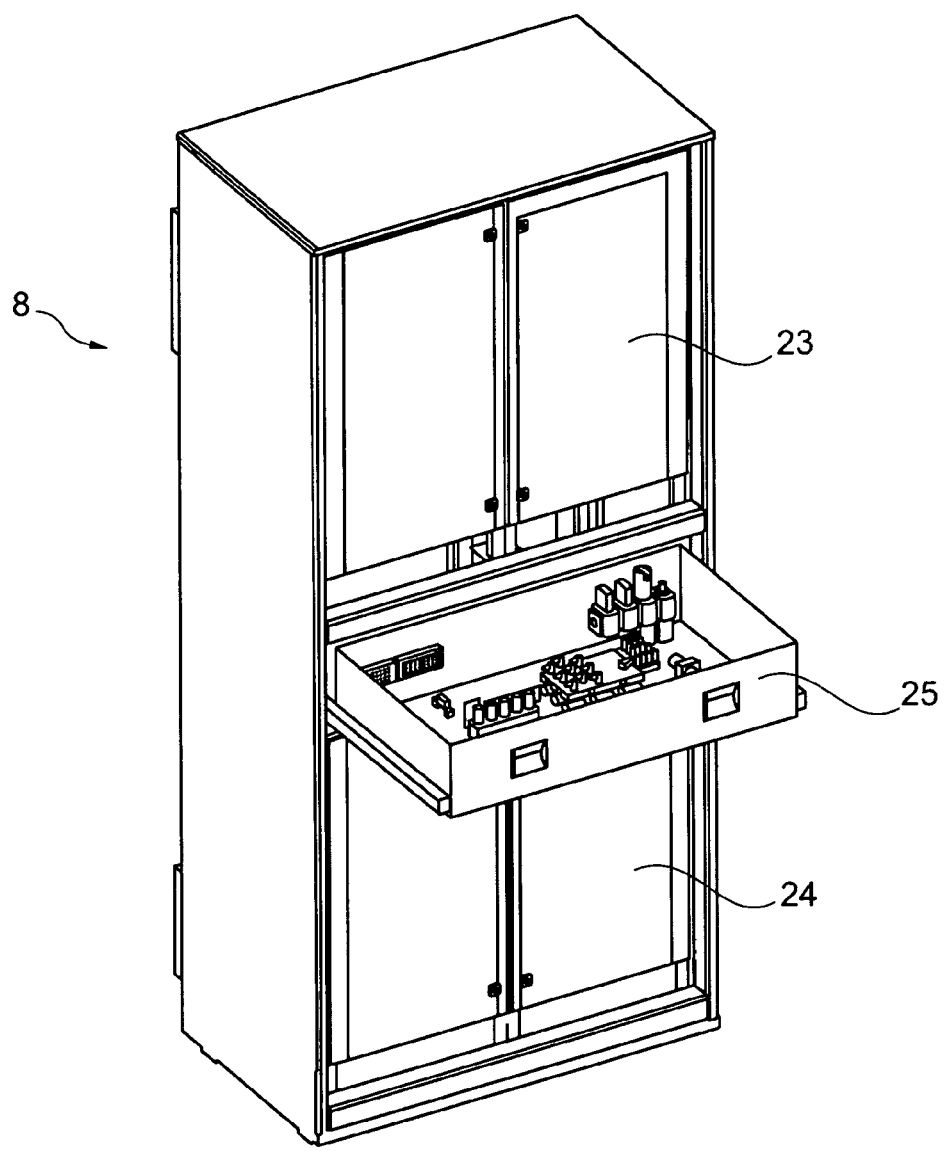
FIG. 3 shows a perspective view of a control cabinet configured as a support column from the painting booth shown in FIG. 1.

FIG. 3 shows a perspective view of the control cabinet 8, the control cabinet 9 shown in FIG. 1 being structurally identical.

The control cabinet 8 has space for a robot controller 23, 24 both in the upper region and in the lower region.

Furthermore, the control cabinet 8 has in the middle a drawer 25 in which for example spare parts, operating instructions or even stray cleaning cloths can be accommodated.

Figure 4:
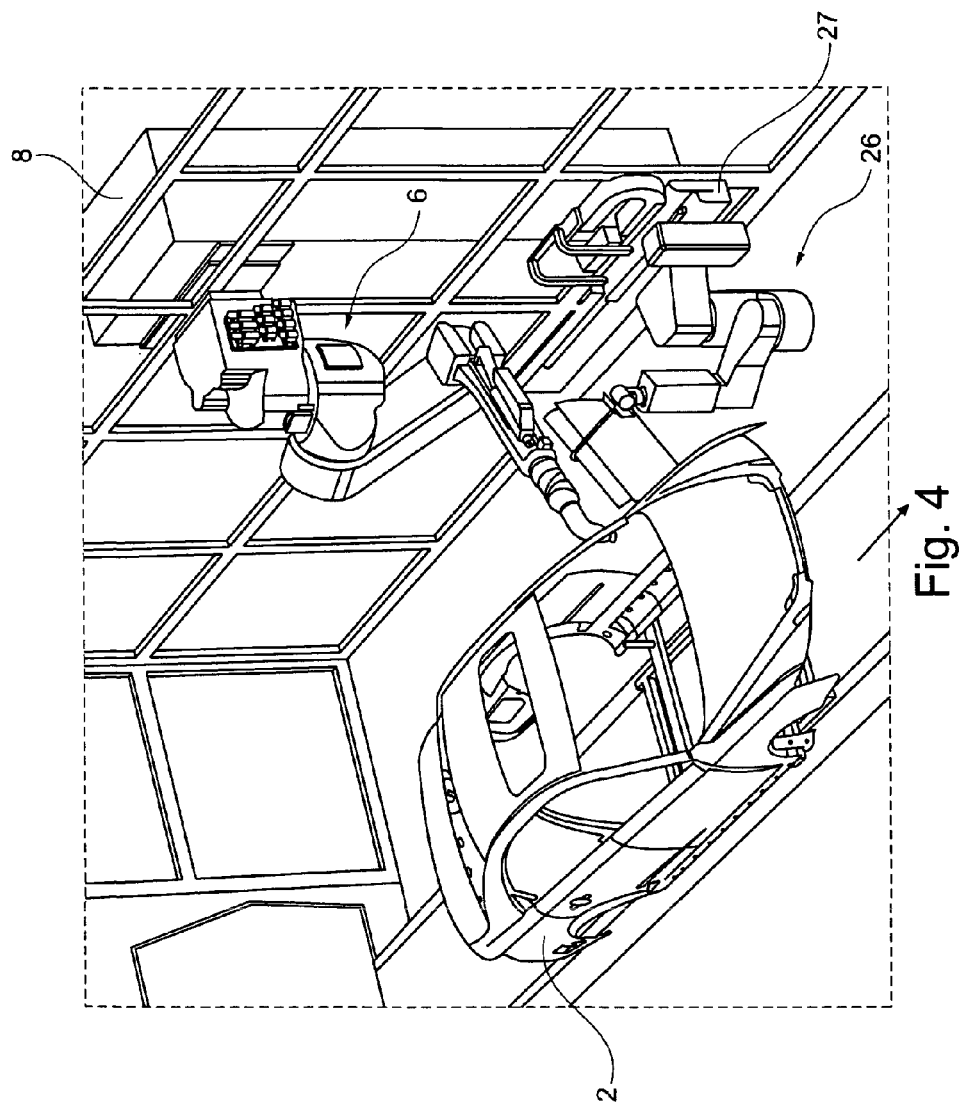
FIG. 4 shows a perspective view of a painting booth with a painting robot mounted in a stationary manner and with a door opener which is displaceable on a stub rail below the painting robot.
Figure 5:
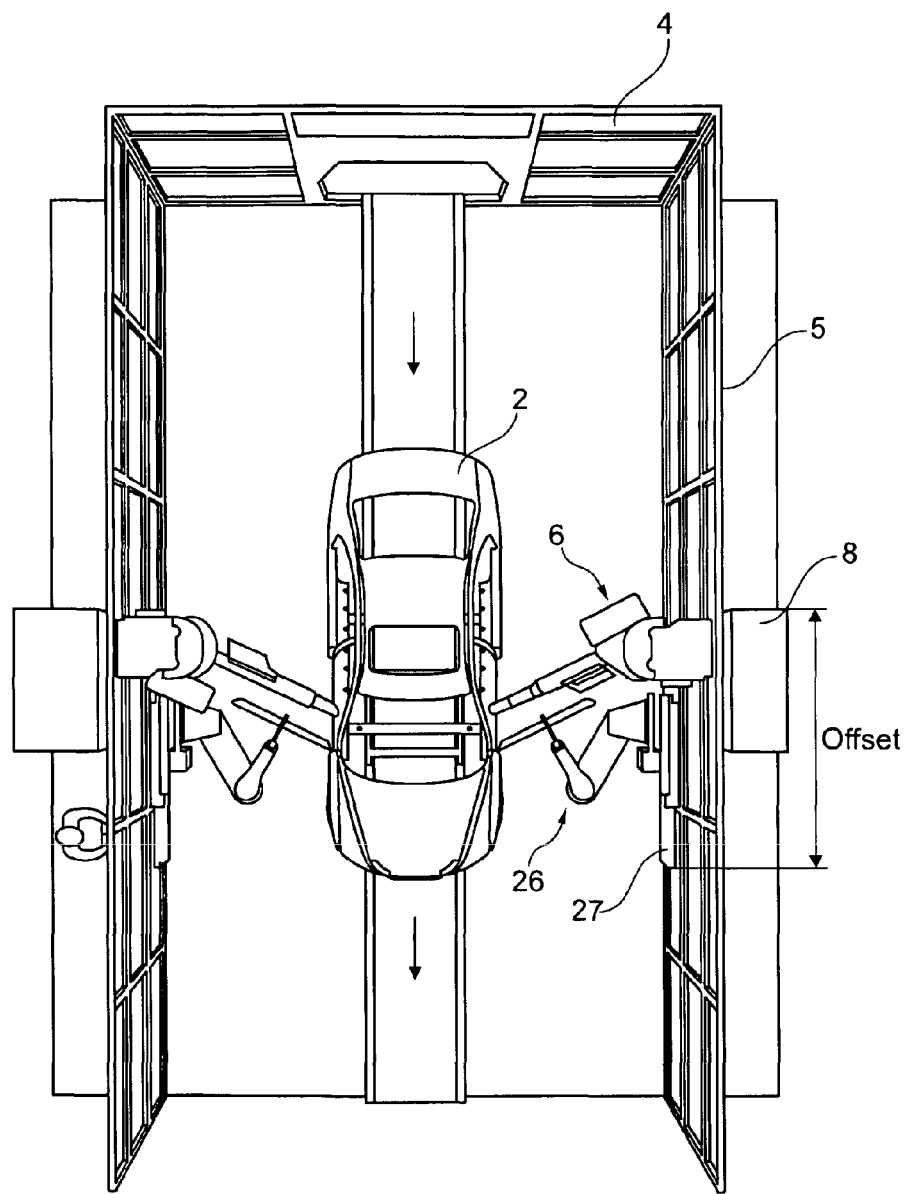
FIG. 5 shows a plan view of the painting booth of FIG. 4.
Figure 6:
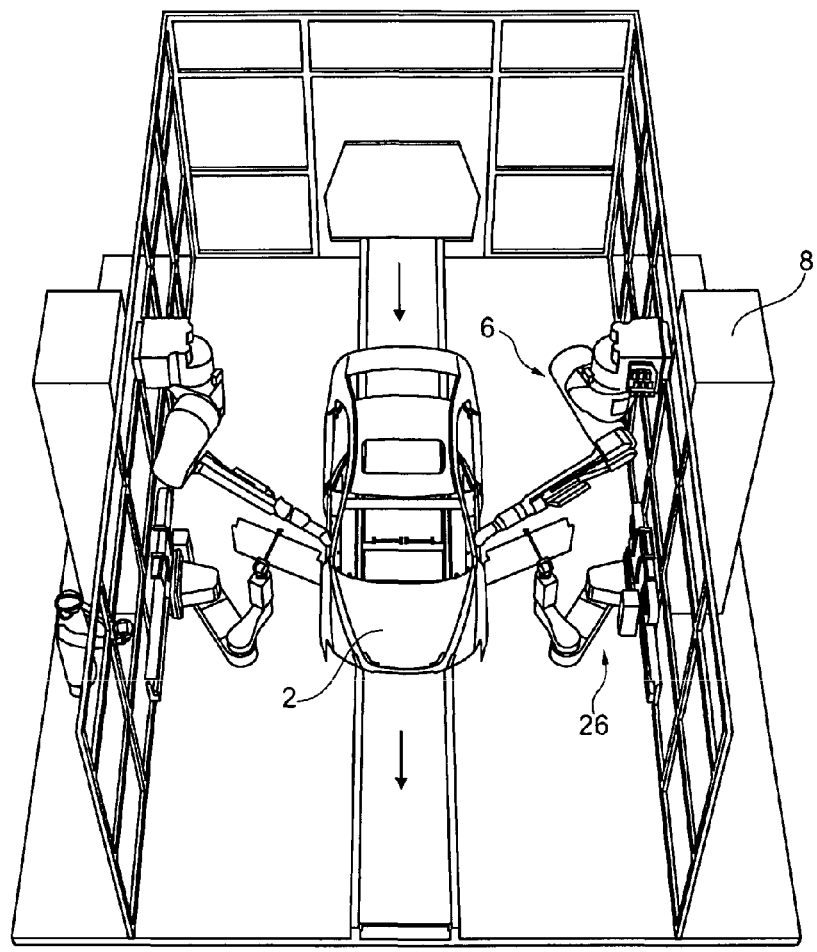
FIG. 6 shows a perspective view of the painting booth of FIGS. 4 and 5.

FIGS. 4 to 6 show another exemplary painting booth 1 which largely corresponds to the painting booth 1 described above, so that reference is made to the above description in order to avoid repetitions, the same references being used below for the same details.

One particular feature of this example lies in the fact that, in addition to the painting robot 6, a handling robot 26 is provided which has the task of opening the doors of the motor vehicle bodies 2 for subsequent painting of the interior by the painting robot 6.

The handling robot 26 is mounted below the painting robot 6 on a stub rail 27 and is displaceable in the direction shown by the arrow.

The stub rail 27 for the handling robot 26 is arranged in a manner offset in the conveying direction relative to the painting robot 6. This is advantageous so that the handling robot 26, once the interior painting by the painting robot 6 has ended, still has enough time to close the door of the motor vehicle body 2 before the motor vehicle body 2 moves out of reach of the handling robot 26 in the direction shown by the arrow.

For the sake of completeness, it must be pointed out that the abovementioned painting devices may be arranged symmetrically in the painting booth on both sides of the motor vehicle body 2.

Figure 7:
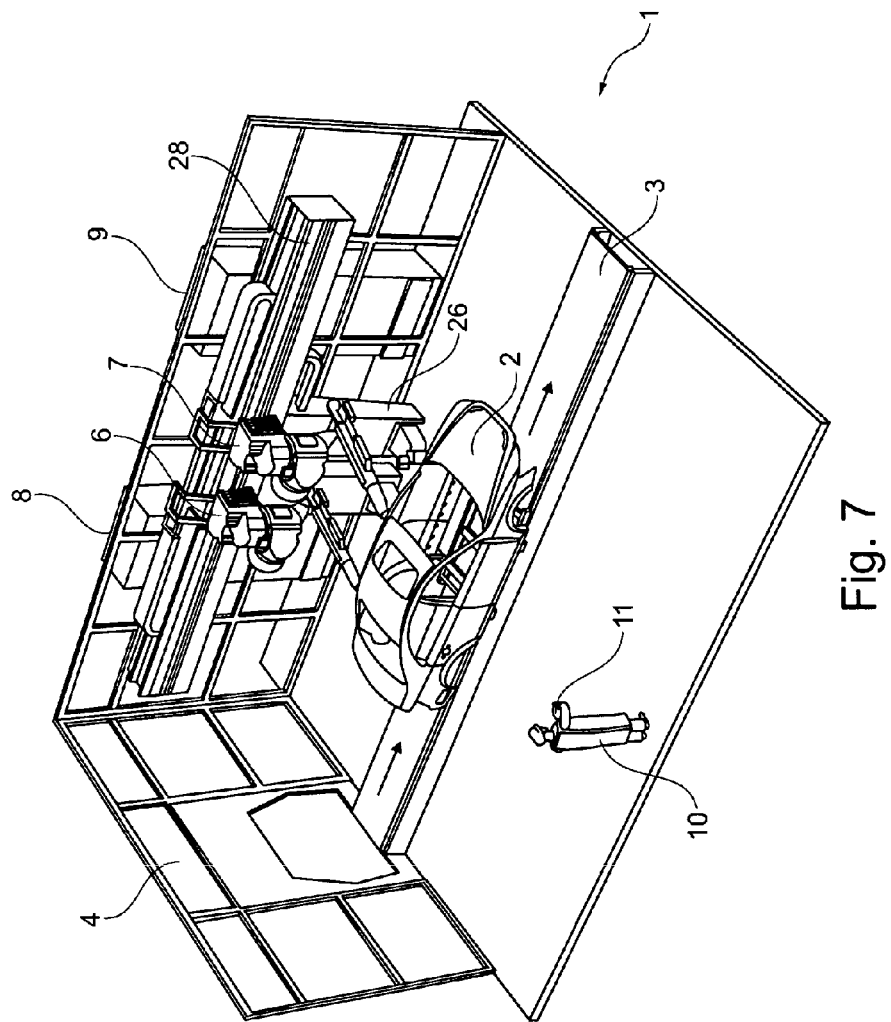
FIG. 7 shows a perspective view of a painting booth with a displacement rail on which two painting robots can be displaced, wherein two handling robots are also displaceable on the displacement rail.
Figure 8:
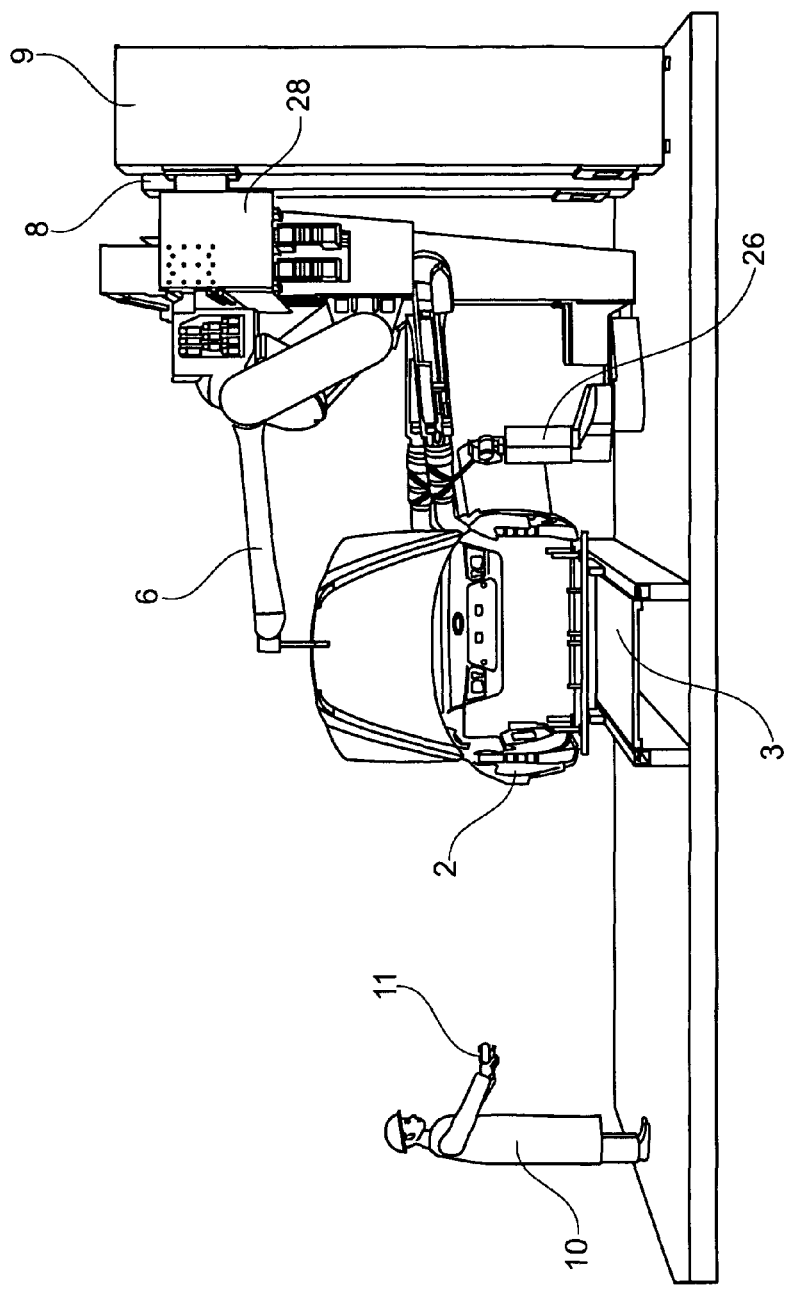
FIG. 8 shows a front view of a painting booth according to an exemplary illustration with displaceable painting robots and likewise displaceable handling robots.

FIGS. 7 and 8 show another exemplary painting booth 1 which largely corresponds to the examples of embodiments described above, so that reference is made to the above description in order to avoid repetitions, the same references being used below for the same details.

One particular feature of this example of embodiment lies in the fact that the painting robots 6, 7 in this example of embodiment are not mounted in a stationary manner but rather on a common displacement rail 28.

Furthermore, the handling robots 26 in this example of embodiment are also suspended on the displacement rail 28.

Figure 9:
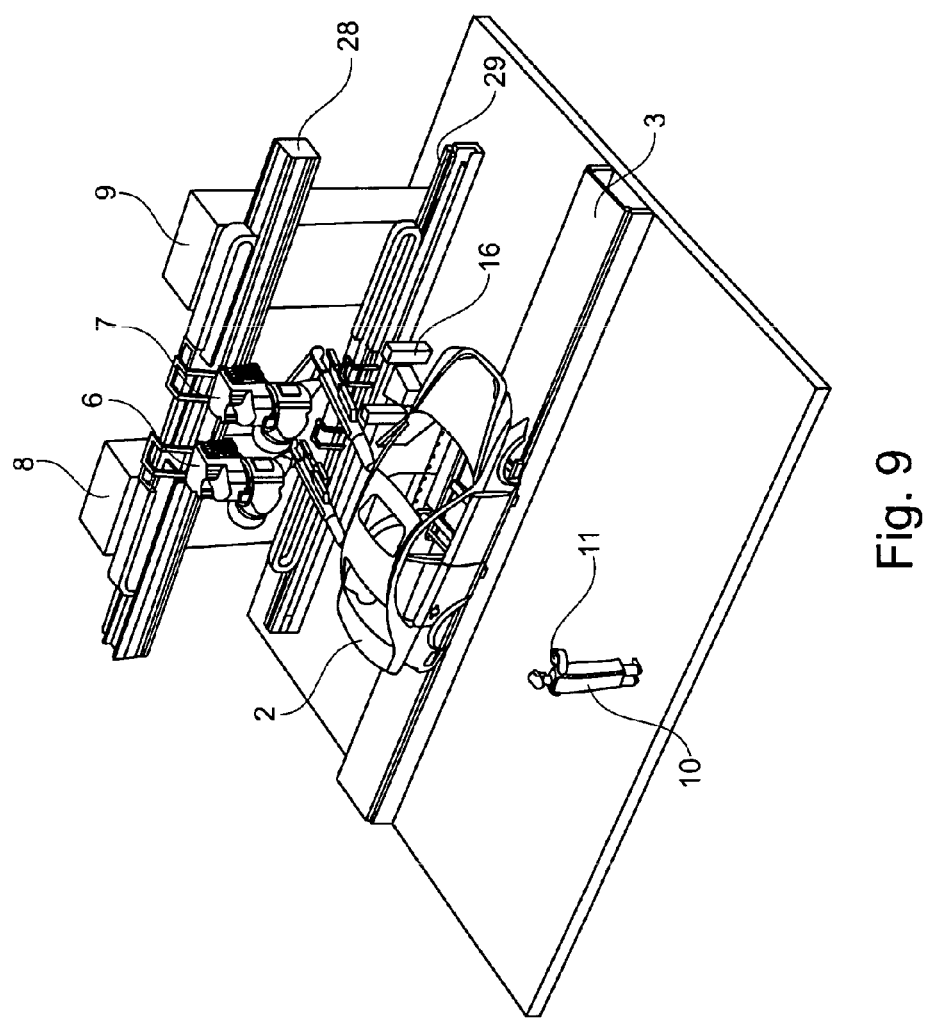
FIG. 9 shows a perspective view of a painting booth with two displacement rails for respectively two painting robots and two handling robots.

FIG. 9 shows another exemplary painting booth 1 which largely corresponds to the example of embodiment described above, so that reference is made to the above description in order to avoid repetitions, the same references being used below for the same details.

One particular feature of this example lies in the fact that a further displacement rail 29 is mounted in the lower region on the control cabinets 8, 9 configured as a support column. The displacement rail 29 in this case carries the handling robots 26, whereas the upper displacement rail 28 carries the painting robots 6, 7.

Figure 10:
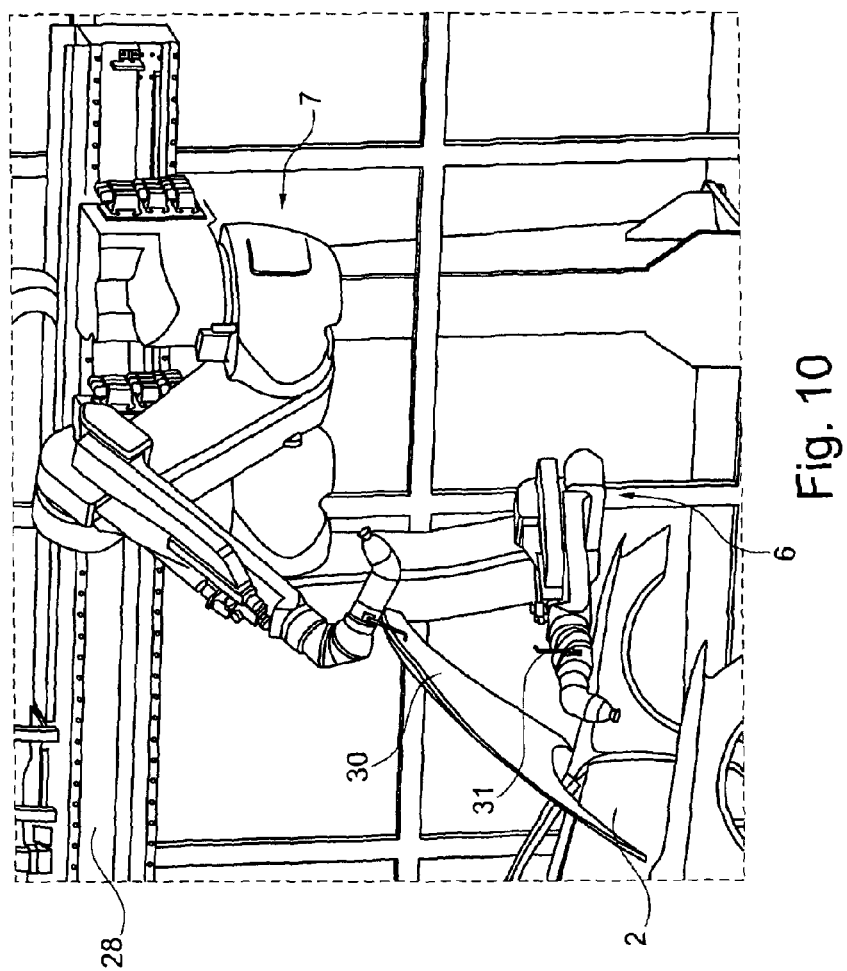
FIG. 10 shows a perspective view of two painting robots which can alternatively be used as handling robots.

FIG. 10 shows a perspective view of a modified painting robot 6 which carries, in addition to the rotary atomizer 17, a handling grip 30 by means of which the painting robot 6 can open and close hoods 31 of the motor vehicle bodies 2. The painting robot 6 is therefore bifunctional in this example of embodiment and can optionally apply paint or serve as a handling robot.

Figure 11:
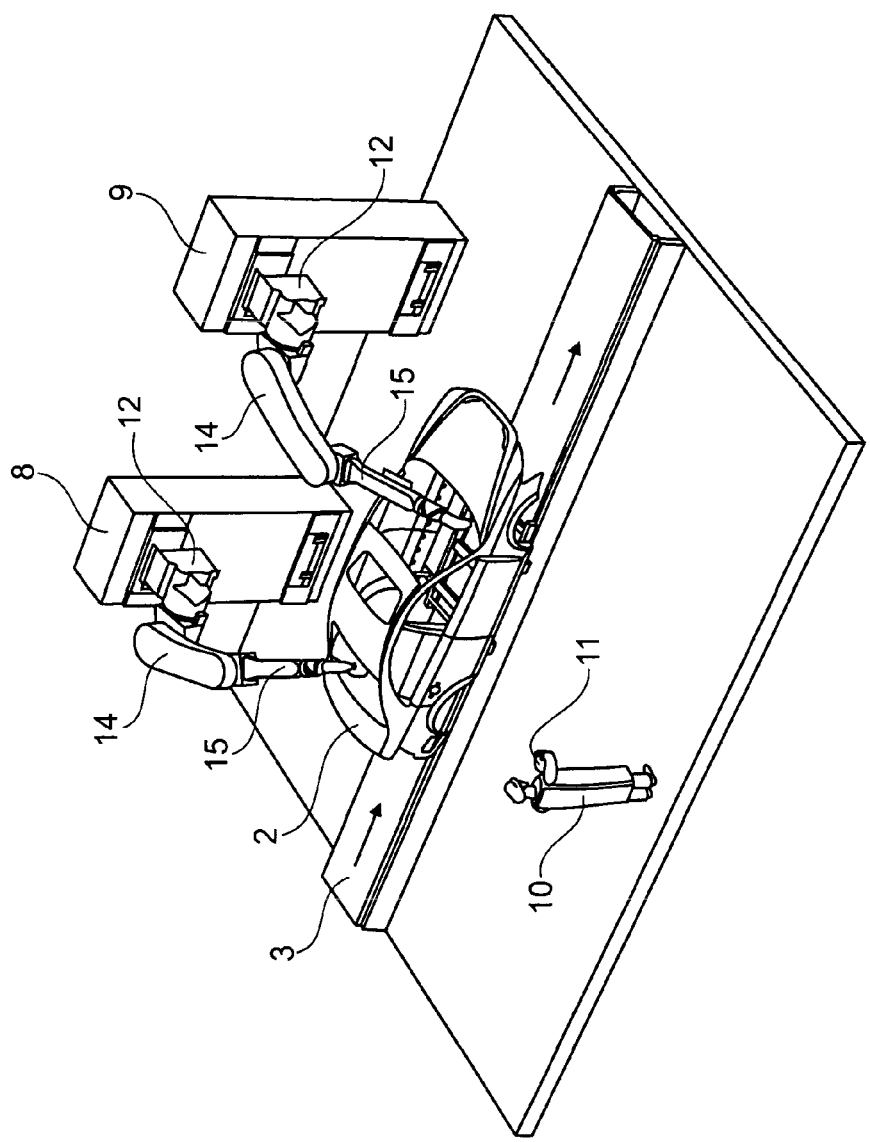
FIG. 11 shows a perspective view of a painting booth with two painting robots mounted in a stationary manner.

Finally, FIG. 11 shows an examplary painting booth 1 which largely corresponds to the example described above, so that reference is made to the above description in order to avoid repetitions, the same references being used below for the same details.

One particular feature of this example lies in the fact that the axis of rotation between the robot base 12 and the rotatable robot part 13 is oriented horizontally and runs parallel to the transport direction of the conveying device 3.

The pivot axes of the proximal robot arm 14 and of the distal robot arm by contrast run here in a plane which is oriented at right angles to the transport direction of the conveying device 3.

Figure 12:
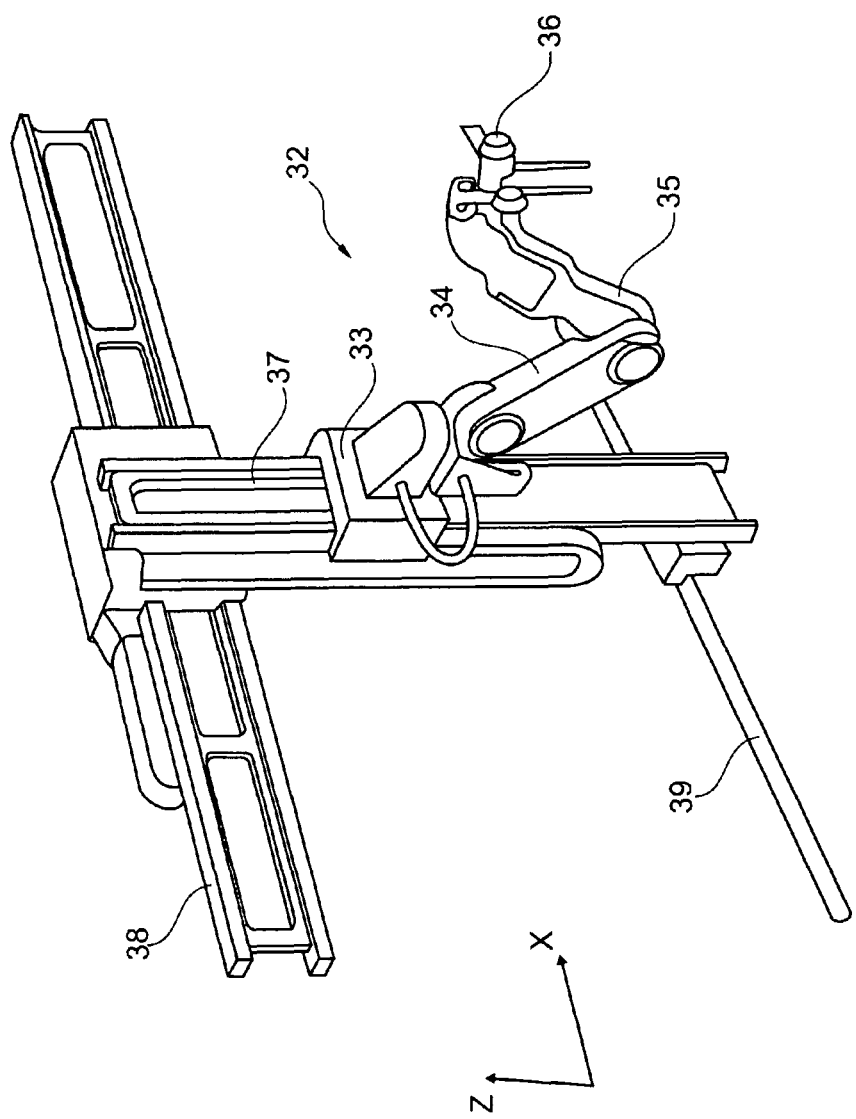
FIG. 12 shows a perspective view of a displaceable painting robot, wherein the painting robot is mounted on a displaceable support column which forms the control cabinet.

FIG. 12 shows a further example of a painting device with a displaceable painting robot 32, wherein the painting robot 32 comprises a robot base 33, a proximal robot arm 34, a distal robot arm 35 and an atomizer 36 which is guided on the distal robot arm 35.

The painting robot 32 is displaceable in the vertical direction (Z direction) on a support column 37. One particular feature here lies in the fact that the support column 37 does not only serve for mechanically guiding the painting robot 32 but rather also contains a robot controller and/or application technology for the painting robot 32, wherein the pneumatic system for the painting robot 32 can be integrated in the support column 37. In this example of embodiment, therefore, the support column 37 forms a control cabinet for the painting robot.

The support column 37 is displaceable in the X direction, i.e. in the conveying direction of the motor vehicle bodies to be painted, on two parallel displacement rails 38, 39 located one above the other.

Figure 13:
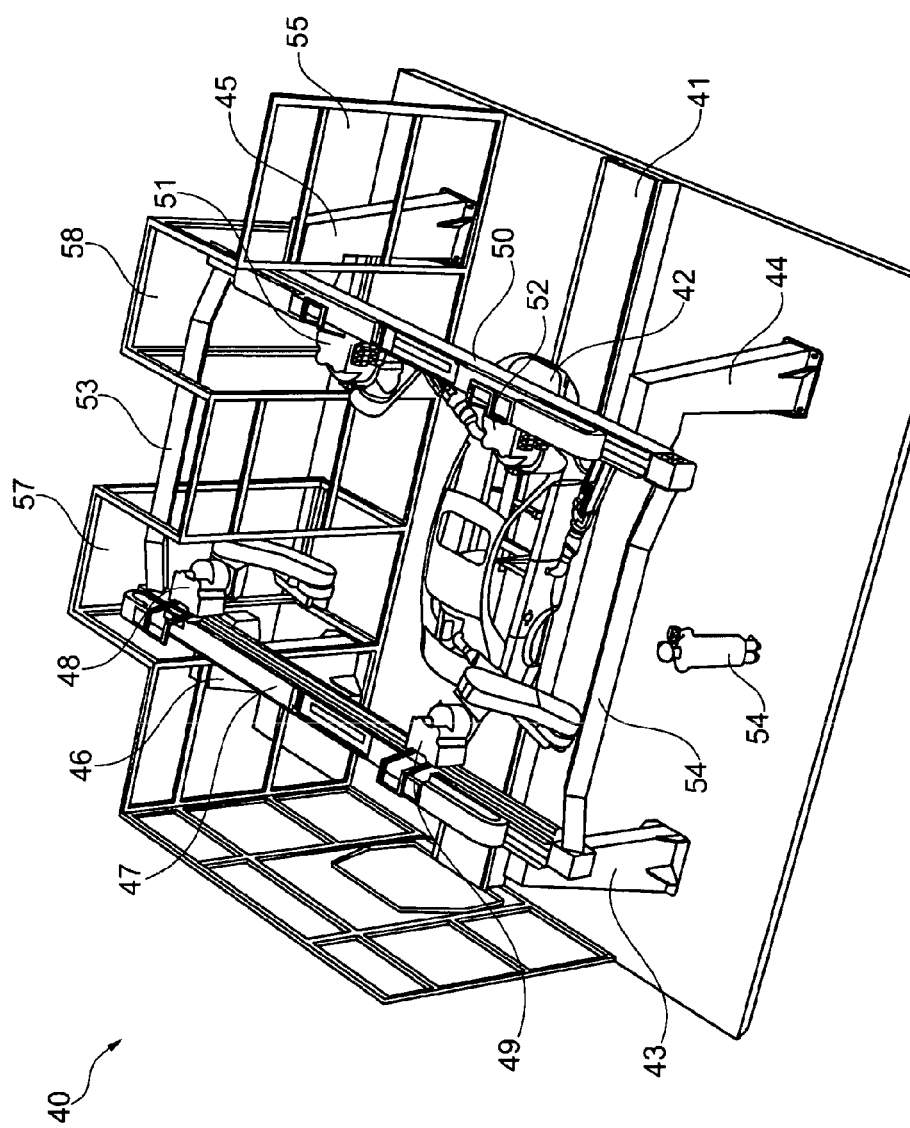
FIG. 13 shows a perspective view of an exemplary painting booth with two displacement rails for in each case two painting robots, said displacement rails running at right angles to the conveying direction of the motor vehicle body.
Figure 15:
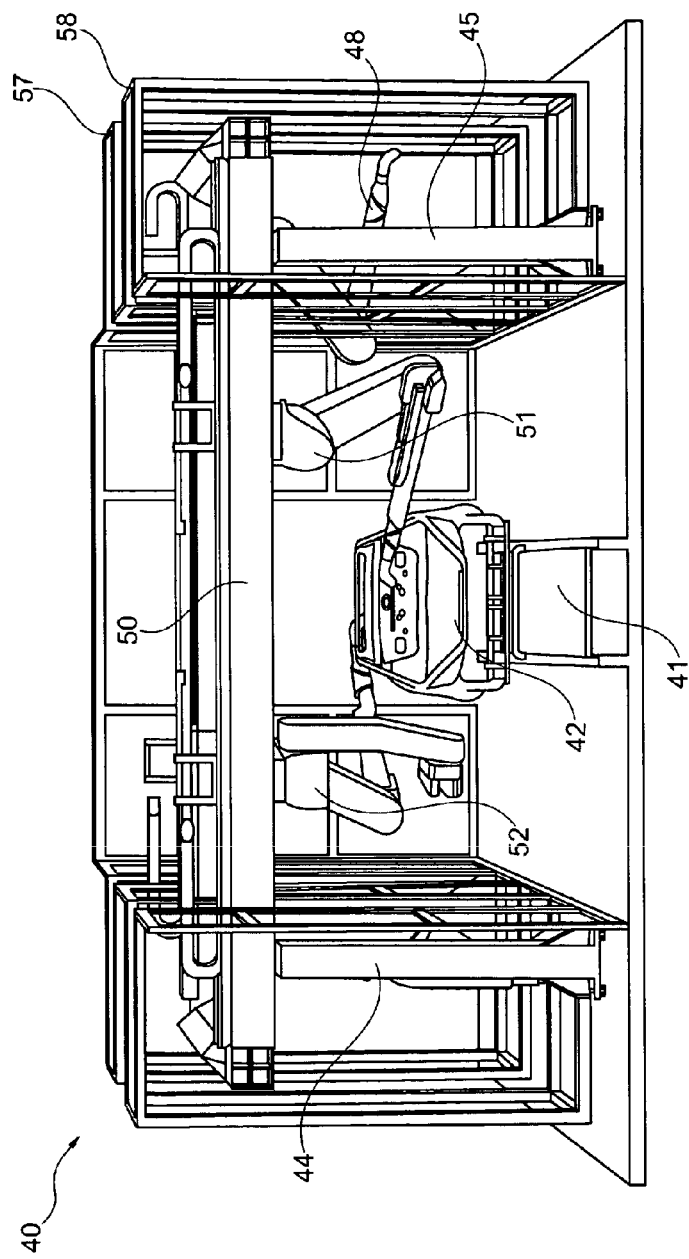
FIG. 15 shows a perspective view of the painting booth of FIGS. 13 and 14 parallel to the conveying direction of the motor vehicle bodies.

FIGS. 13 and 15 show a further examplary painting booth 40 which can be arranged in a painting facility, further painting stations being located in front of and behind the painting booth 40 in the conveying direction.

Running through the painting booth 40 is a conveyor 41 along which motor vehicle bodies 42 are transported linearly through the painting booth 40.

Located outside the painting booth are four support columns 43, 44, 45, 46, wherein the support columns 43, 46 arranged on the input side carry a displacement rail 47 arranged on the input side and oriented at right angles to the conveying direction of the conveyor 41. Two painting robots 48, 49 can be displaced along the displacement rail 47 at right angles to the conveying direction of the conveyor 41.

The two support columns 44, 45 arranged on the output side jointly carry on their upper side a further displacement rail 50 which is likewise oriented at right angles to the conveying direction of the conveyor 41. Two painting robots 51, 52 are likewise displaceably arranged on the displacement rail 50.

The painting robots 48, 49 and 51, 52 each have so-called inverse kinematics. This means that the robot base of the painting robots 48, 49, 51, 52 is turned upside down in comparison to conventional painting robots, so that the robot arms of the painting robots 48, 49, 51, 52 are located below the respective robot base.

The two displacement rails 47, 50 are each connected to one another at their ends by a longitudinal strut 53, 54, so that the two displacement rails 47, 50 together with the longitudinal struts 53, 54 form a stable frame.

The painting booth 40 is delimited laterally and at its end sides by a peripheral booth wall 55, the booth wall 55 being transparent so that an operator 56 located outside the painting booth 40 can carry out from outside a visual monitoring of the painting process taking place inside the painting booth 40.

Figure 14:
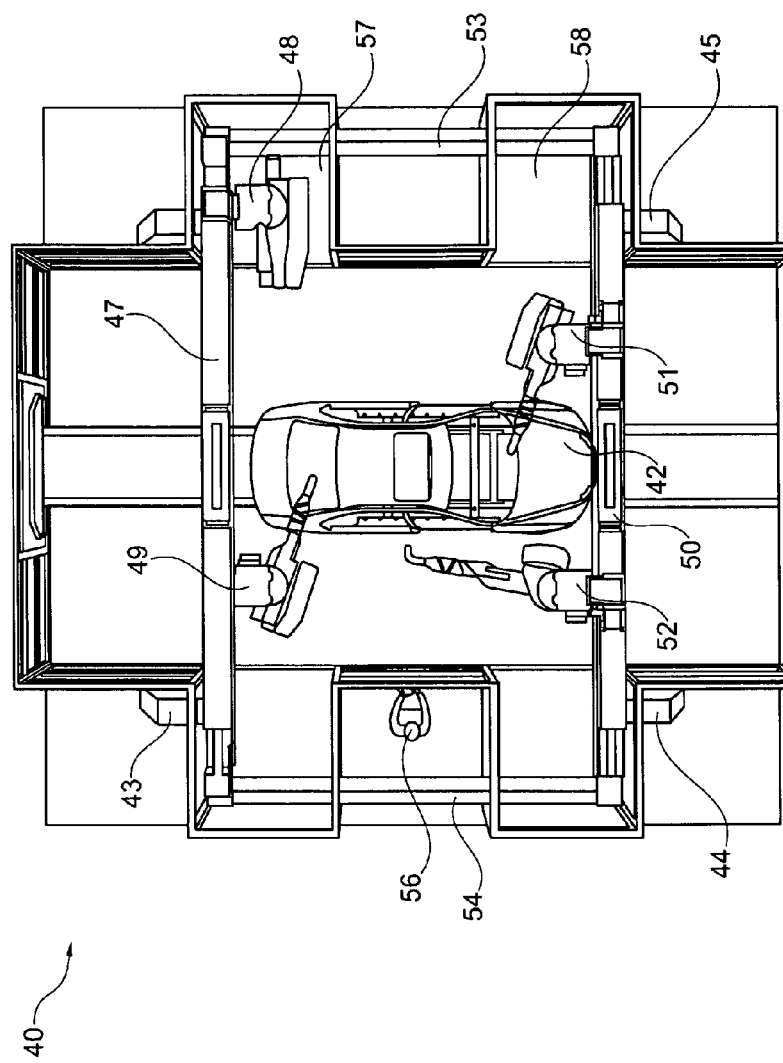
FIG. 14 shows a plan view of the painting booth of FIG. 13.

It should also be mentioned that the booth wall 55 in each case has a lateral indentation 57, 58 laterally in the extension of the two displacement rails 47, 50, so that the painting robots 48, 49 and 51, 52 can be moved in the lateral direction on the displacement rails 47, 50 into the indentations 57, 58, as a result of which the movement clearance of the painting robots 48, 49, 51, 52 in the lateral direction is increased. The booth width of the painting booth 40 between the lateral indentations 57, 58 is smaller than in the region of the indentations 57, 58, so that the operator 56 can observe from a smaller distance the painting process taking place in the interior of the painting booth, as can be seen in particular from FIG. 14.

Figure 16:
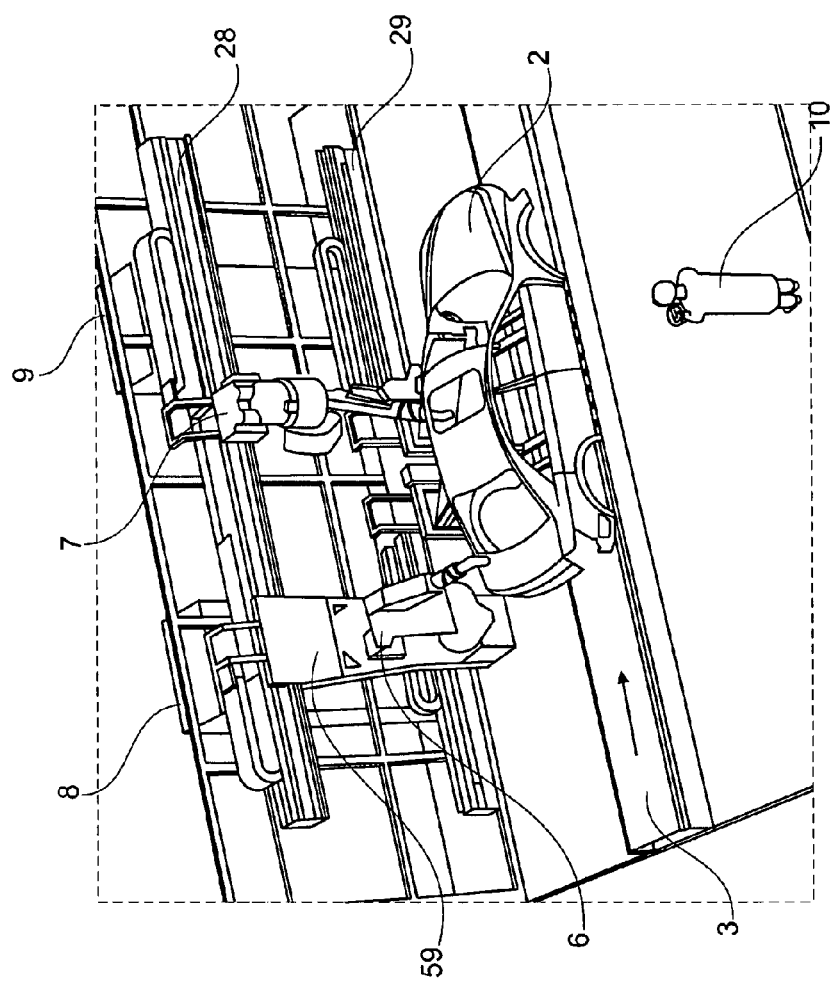
FIG. 16 shows a perspective view of an alternative example of embodiment of an exemplary painting booth with a displacement rail located at the top, wherein the painting robot is displaceable on the displacement rail and is lowered with respect to the displacement rail.
Figure 17:
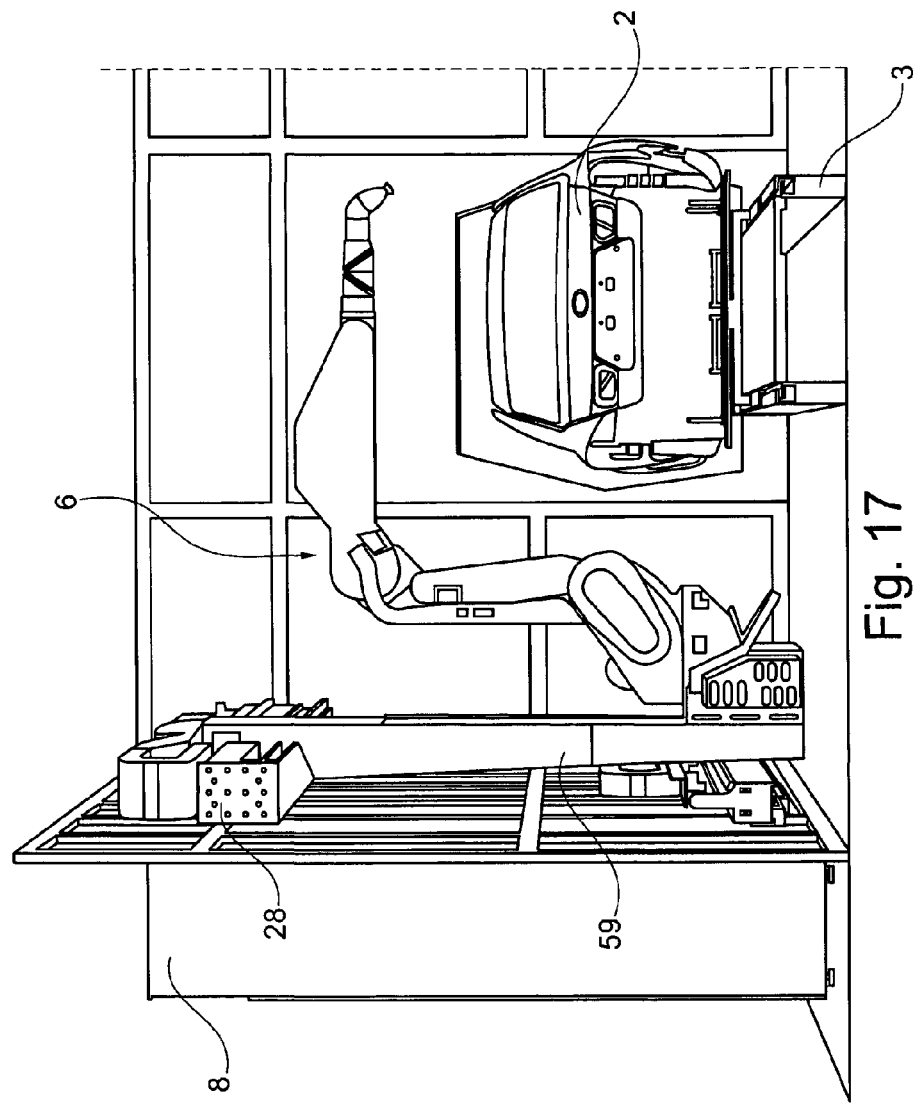
FIG. 17 shows a perspective view of the painting booth of FIG. 17 parallel to the conveying direction of the motor vehicle bodies.

The example shown in FIGS. 16 and 17 largely corresponds to the example of embodiment shown in FIG. 9, so that reference is made to the above description in order to avoid repetitions, the same references being used below for the same details.

One particular feature of this exemplary illustration lies in the fact that the painting robot 6 is arranged in a manner offset downward relative to the displacement rail 28, even though the painting robot 6 is displaceable on the upper displacement rail 28. To this end, use is made of a substantially vertically oriented carrier 59 which is displaceable on its upper side along the displacement rail 28, while the carrier 59 carries on its underside the robot base of the painting robot 6. The carrier 59 therefore serves to lower the painting robot 6 relative to the upper displacement rail 28.

Figure 18:
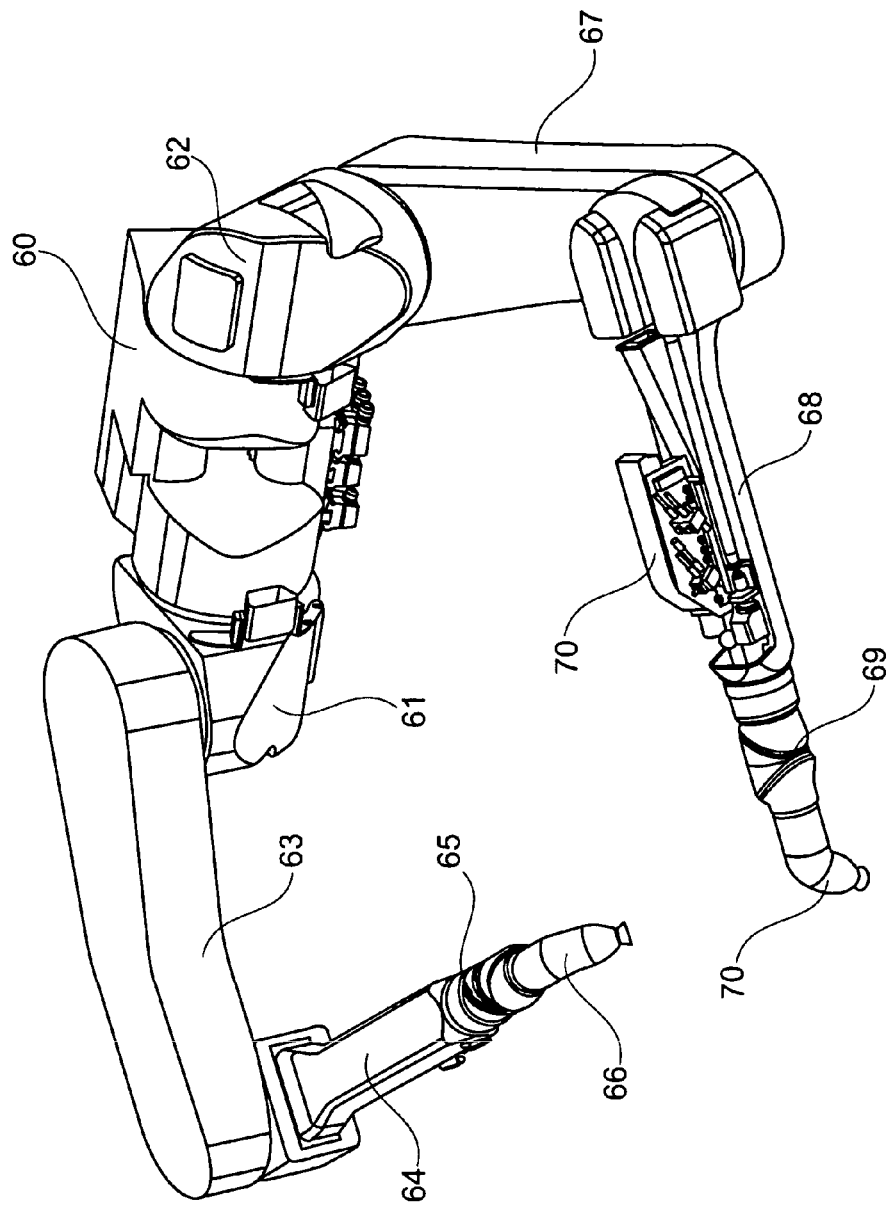
FIG. 18 shows an exemplary illustration of a painting robot comprising a robot base on which a plurality of robot arms are movably articulated.

FIG. 18 shows a perspective view of a painting robot comprising a robot base 60 which is either arranged in a stationary manner or displaceable on a displacement rail.

Two robot parts 61, 62 are rotatably mounted on the robot base 60 on opposite sides, wherein the two robot parts 61, 62 can rotate relative to the common robot base 60 about a common, horizontally running axis of rotation.

A proximal robot arm 63 and a distal robot arm 64 are pivotably arranged on the rotatable robot part 61, wherein the distal robot arm 64 guides a rotary atomizer 66 via a robot hand axle 65.

In the same way, a proximal robot arm 67 and a distal robot arm 68 are pivotably arranged on the rotatable robot part 62, wherein the distal robot arm 68 likewise guides a rotary atomizer 70 via a robot hand axle 69.

It should also be mentioned that application technology 70 is arranged on the distal robot arm 68, this also applying in the same way to the distal robot arm 64 shown in the closed state.

Figure 19:
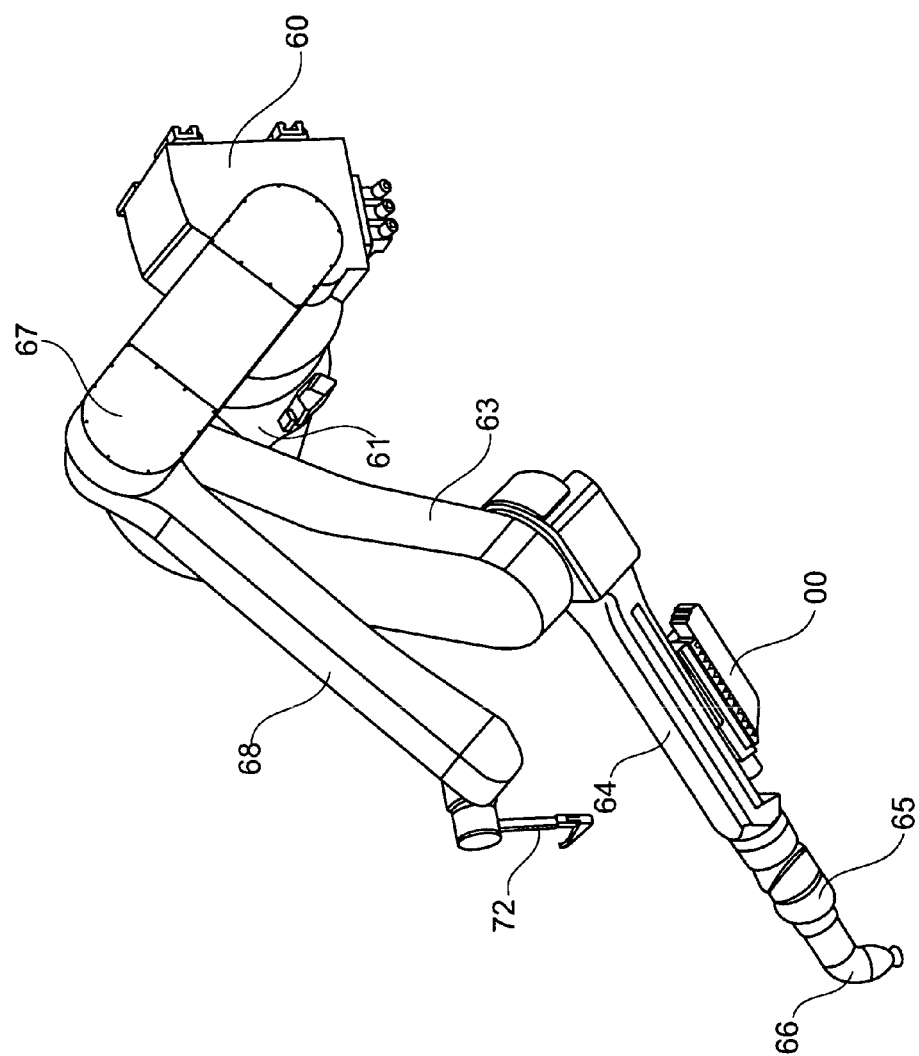
FIG. 19 shows a perspective view of another examplary painting robot with a plurality of robot arms arranged kinematically in parallel.

FIG. 19 shows a modification of the painting robot of FIG. 18, so that reference is made to the above description in order to avoid repetitions, the same references being used below for the same details.

One particular feature of this example lies in the fact that the distal robot arm 68 does not guide a rotary atomizer but rather a grip 72 for opening and closing a hood of a motor vehicle body. In this example of embodiment, therefore, the painting robot does not only allow the application of paint but rather serves also as a handling robot and specifically as a hood opener.

In relation to this example, it should also be mentioned that the proximal robot arm 67 is pivotably articulated directly on the robot base 60, without the interposition of the robot part 62.

The exemplary illustrations are not limited to the examples specifically described above. Instead, a large number of variants and modifications are possible which likewise make use of the inventive concepts and therefore fall within the scope of protection.

It should also be noted that the exemplary illustrations also include the subject matter of the appended dependent claims without the features of the independent claims to which reference is made or only with some features of the independent claims.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

The invention claimed is:

1. A painting device for painting components, comprising:
a multi-axis painting robot which positions an atomizer,
a robot controller for controlling the painting robot, and
a control cabinet that includes therein the robot controller,
wherein the control cabinet forms a support column that extends from a floor and that mechanically supports the multi-axis painting robot, and
further wherein:
a) the support column forming the control cabinet is displaceable on a displacement rail, and
b) the displacement rail for the support column is oriented substantially parallel to the conveying direction of the motor vehicle bodies to be painted, and
c) the displaceable support column is oriented substantially vertically, and
d) the painting robot is displaceable on the support column in the vertical direction.

2. The painting device according to claim 1, wherein
a) the painting device together with the painting robot and the control cabinet forms a preassembled module, b) the control cabinet has an interface via which fluid and electrical supply lines necessary for operation of the painting robot can be connected, and c) the fluid and electrical supply lines supply lines are guided in the preassembled module from the interface of the control cabinet to the multi-axis painting robot.

3. The painting robot according to claim 2, wherein the interface comprises at least one of the following supply lines:

a) at least one pneumatic line for supplying compressed air to the multi-axis painting robot, b) at least one paint line for supplying the painting robot with the multi-axis paint to be applied, c) a flushing agent line for supplying a flushing agent to the multi-axis painting robot, d) a return line for the return of at least one of the flushing agent and the paint from the multi-axis painting robot, e) electrical control lines for actuation of the robot by the robot controller, f) at least one sensor line for the reporting of sensor variables from the multi-axis painting robot to the robot controller.

4. The painting device according to claim 1, wherein a) the multi-axis painting robot is detachably connected to the control cabinet through an interface, and b) the multi-axis painting robot is mechanically attached to the support column through the interface, and c) the interface contains fluid and electrical supply lines between the control cabinet and the painting robot that are necessary for operation of the multi-axis painting robot.

5. The painting device according to claim 1, wherein a) the multi-axis painting robot comprises a robot base, a rotatable robot part, a pivotable proximal robot arm and a pivotable distal robot arm, b) the rotatable robot part is rotatable relative to the robot base about a substantially vertical axis of rotation, c) the proximal robot arm is pivotable relative to the rotatable robot part, d) the distal robot arm is pivotable relative to the proximal robot arm.

6. The painting device according to claim 1, wherein a) the multi-axis painting robot comprises a robot base, a rotatable robot part, a pivotable proximal robot arm and a pivotable distal robot arm, b) the rotatable robot part is rotatable relative to the robot base about a substantially horizontal axis of rotation, c) the proximal robot arm is pivotable relative to the rotatable robot part, d) the distal robot arm is pivotable relative to the proximal robot arm.

7. The painting device according to claim 6, wherein a) the distal robot arm is pivotably connected to the proximal robot arm via an elbow joint, and b) the elbow joint between the proximal robot arm and the distal robot arm is directed downward in at least one robot position, and c) the distal robot arm in one robot position runs substantially horizontally and can be introduced in the horizontal direction into an interior of a motor vehicle body in order to paint the interior, and d) the elbow joint between the proximal robot arm and the distal robot arm is directed upward in at least one robot position, and e) the multi-axis painting robot is suitable for painting the interior of motor vehicle bodies.

8. The painting device according to claim 5, wherein a) the rotatable robot part is arranged below the robot base, or b) the rotatable robot part is arranged to the side of the robot base, or c) the rotatable robot part is arranged above the robot base.

9. The painting device according to claim 5, wherein a) a plurality of flexible supply hoses are provided for supplying the media necessary for operation of the multi-axis painting robot, b) a rotatable joint is arranged between the proximal robot part and one of the rotatable robot part and the distal robot arm, c) the supply hoses are guided through the rotatable joint on a neutral fiber so that the supply hoses are not subjected to tensile or compressive stress in the longitudinal direction during a rotation of the rotatable joint, but rather are subjected only to a bending load, and d) the supply hoses run through the axis of rotation of the joint, and e) the individual supply hoses in the multi-axis painting robot run in each case in a hose plane from the rotatable robot part to the distal robot arm so that the flexible supply hoses are bent only in the hose plane during a pivoting of the robot arms.

10. The painting device according to claim 5, further comprising application technology which is arranged a) in or on the proximal robot arm and b) in or on the distal robot arm.

11. The painting device according to claim 10, wherein a) the application technology comprises components for frequently used coating agents and components for rarely used coating agents, and b) the components of the application technology for the rarely used coating agents are mounted on or in the proximal robot arm, and c) the components of the application technology for the frequently used coating agents are mounted on or in the distal robot arm.

12. The painting device according to claim 10, wherein the application technology arranged in or on the robot arm includes the following equipment:

a) at least one color changer for selecting a desired color, wherein the color changer is connected on the input side to a plurality of color feed lines and on the output side to an atomizer, and b) at least one metering pump or another metering element which meters the paint to be applied, and c) a motor for driving the metering pump or metering element, and d) a paint pressure regulator for regulating the application pressure, and e) a high voltage generator for generating the high voltage required for electrostatic painting.

13. The painting device according to claim 1, further comprising a conveyor which conveys the components to be painted through the painting device, wherein the robot base is offset in the upward direction relative to the conveyor.

14. The painting device according to claim 1, wherein a) the multi-axis painting robot is arranged in a painting booth, b) the control cabinet configured as the support column is arranged outside the painting booth, and c) the painting booth has booth walls which are substantially smooth, and d) the painting booth has booth walls which are at least partially transparent or have at least one viewing window.

15. The painting device according to claim 1, wherein the multi-axis painting robot has, in addition to an atomizer, a handling grip for opening doors or hoods of the components to be painted.

16. The painting device according to claim 1, wherein the multi-axis painting robot comprises a robot base on which at least two robot arms are movably articulated.

17. The painting device according to claim 16, wherein the robot arms each guide an atomizer.

18. The painting device according to claim 16, wherein one robot arm guides an atomizer while the other robot arm guides a handling tool.

19. The painting device according to claim 1, wherein:
   a) the painting device together with the painting robot and the control cabinet forms a preassembled module,
   b) the control cabinet has an interface via which fluid and electrical supply lines necessary for operation of the painting robot can be connected, and
   c) the fluid and electrical supply lines supply lines are guided in the preassembled module from the interface of the control cabinet to the multi-axis painting robot.

20. The painting device according to claim 1, wherein
   a) the multi-axis painting robot is detachably connected to the control cabinet through an interface, and
   b) the multi-axis painting robot is mechanically attached to the support column through the interface, and
   c) the interface contains fluid and electrical supply lines between the control cabinet and the painting robot that are necessary for operation of the multi-axis painting robot.

21. The painting device according to claim 1, wherein the interface comprises at least one of the following supply lines:
   a) at least one pneumatic line for supplying compressed air to the multi-axis painting robot,
   b) at least one paint line for supplying the painting robot with the multi-axis paint to be applied,
   c) a flushing agent line for supplying a flushing agent to the multi-axis painting robot,
   d) a return line for the return of at least one of the flushing agent and the paint from the multi-axis painting robot,
   e) electrical control lines for actuation of the robot by the robot controller,
   f) at least one sensor line for the reporting of sensor variables from the multi-axis painting robot to the robot controller.

* * * * *